United States Patent
Ihara

(10) Patent No.: US 7,199,891 B1
(45) Date of Patent: *Apr. 3, 2007

(54) IMAGE PROCESSING METHOD AND APPARATUS, PRINTING METHOD AND APPARATUS, IMAGE PRINTING SYSTEM AND METHOD AND RECORDING MEDIUM

(75) Inventor: Yushi Ihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 657 days.

This patent is subject to a terminal disclaimer.

(21) Appl. No.: 09/640,629

(22) Filed: Aug. 17, 2000

(30) Foreign Application Priority Data

Aug. 19, 1999 (JP) .................................. 11-233254

(51) Int. Cl.
*H04N 1/40* (2006.01)

(52) U.S. Cl. ...................................... 358/1.15; 358/468
(58) Field of Classification Search ...... 398/1.14–1.16, 398/1.9, 498
See application file for complete search history.

(56) References Cited

U.S. PATENT DOCUMENTS

| | | | | |
|---|---|---|---|---|
| 5,459,553 | A | * 10/1995 | Kim | ............................. 399/20 |
| 6,032,944 | A | * 3/2000 | Lee | ............................. 271/110 |
| 6,603,737 | B1 | * 8/2003 | Fukunaga et al. | ........... 370/229 |
| 6,618,163 | B1 | * 9/2003 | Roosen et al. | .............. 358/1.15 |

FOREIGN PATENT DOCUMENTS

| | | |
|---|---|---|
| EP | 0 739 112 | 10/1996 |
| EP | 0 749 071 | 12/1996 |
| EP | 0 822 510 | 2/1998 |
| EP | 0 859 323 | 8/1998 |
| EP | 0 864 986 | 9/1998 |

* cited by examiner

*Primary Examiner*—Thomas D Lee
*Assistant Examiner*—Stephen Brinich
(74) *Attorney, Agent, or Firm*—Frommer Lawrence & Haug LLP; William S. Frommer; Thomas F. Presson

(57) ABSTRACT

In equipments interconnected over an interface pursuant to the IEEE 1394 standard, the information indicating the detailed printing state is transmitted/received to prompt the user to take proper measures. An image printing system, proposed to this end, includes an STB 3 having an data conversion unit 13 and a printing device 5 having a data input unit 31. The data conversion unit 13 of the STB 3 generates a printing state information request which demands the printing state information including the error information and the alarm information, outputs the image data and the printing state information request in a packet pursuant to the IEEE 1394 standard and is fed with a response to the printing state information request. The data input unit 31 is fed with the printing state information request, including the image data, error information and the alarm information and, responsive to the printing state information request, generates the printing state information during printing and contains the generated printing state information in a packet pursuant to the IEEE 1394 standard to output the resulting packet to the data conversion unit 13 of the STB 3.

12 Claims, 26 Drawing Sheets

| | pixel_x | pixel_y | interlaced/progressive | pixel format | screen aspect ratio | pixel aspect ratio | based standard | image size |
|---|---|---|---|---|---|---|---|---|
| 1080_422_16x9 | 1920 | 1080 | interlaced/progressive | YCbCr 4:2:2 | 16:9 | 1:1 | ITU-R BT.709-2 | 3.96MB |
| 1080_420_16x9 | 1920 | 1080 | interlaced/progressive | YCbCr 4:2:0 | 16:9 | 1:1 | ITU-R BT.709-2 | 2.97MB |
| 720_422_16x9 | 1280 | 720 | progressive | YCbCr 4:2:2 | 16:9 | 1:1 | ANSI/SMPTE 296M-1997 | 1.76MB |
| 720_420_16x9 | 1280 | 720 | progressive | YCbCr 4:2:0 | 16:9 | 1:1 | ANSI/SMPTE 296M-1997 | 1.32MB |
| 576_422_4x3 | 720 | 576 | interlaced/progressive | YCbCr 4:2:2 | 4:3 | 1.07:1 | ITU-R BT.1203 | 810KB |
| 576_420_4x3 | 720 | 576 | interlaced/progressive | YCbCr 4:2:0 | 4:3 | 1.07:1 | ITU-R BT.1203 | 608KB |
| 480_422_16x9 | 720 | 480 | interlaced/progressive | YCbCr 4:2:2 | 16:9 | 1.19:1 | ITU-R BT.709-2 | 675KB |
| 480_420_16x9 | 720 | 480 | interlaced/progressive | YCbCr 4:2:0 | 16:9 | 1.19:1 | ITU-R BT.709-2 | 506KB |
| 480_422_4x3 | 720 | 480 | interlaced/progressive | YCbCr 4:2:2 | 4:3 | 0.89:1 | ITU-R BT.601-4 | 675KB |
| 480_420_4x3 | 720 | 480 | interlaced/progressive | YCbCr 4:2:0 | 4:3 | 0.89:1 | ITU-R BT.601-4 | 506KB |

FIG.6

|  | msb | | | | | | lsb |
|---|---|---|---|---|---|---|---|
| opcode | CAPTURE($42_{16}$) ||||||| 
| operand[0] | subfunction |||||||
| operand[1] | source_subunit_type |||| source_subunit_ID |||
| operand[2] | source_plug |||||||
| operand[3] | status |||||||
| operand[4] | dest_plug |||||||
| operand[5]<br>:<br>operand[16] | print_job_ID |||||||
| operand[17]<br>operand[18]<br>operand[19]<br>operand[20] | data_size |||||||
| operand[21]<br>operand[22] | image_size_x |||||||
| operand[23]<br>operand[24] | image_size_y |||||||
| operand[25]<br>operand[26] | image_format_specifier |||||||
| operand[27]<br>operand[28]<br>operand[29] | reserved |||||||
| operand[30] | next_pic |||||||
| operand[31]<br>operand[32] | next_page |||||||

FIG.7

| value | Type | Meaning |
|---|---|---|
| $20_{16}$ | 1080i_422chunky_16x9 | |
| $21_{16}$ | 1080p_422chunky_16x9 | |
| $22_{16}$ | 720p_422chunky_16x9 | |
| $23_{16}$ | 480i_422chunky_16x9 | |
| $24_{16}$ | 480p_422chunky_16x9 | |
| $25_{16}$ | 480i_422chunky_4x3 | |
| $26_{16}$ | 480p_422chunky_4x3 | |
| $28_{16}$ | 1080i_422liner_16x9 | |
| $29_{16}$ | 1080p_422liner_16x9 | |
| $2A_{16}$ | 720p_422liner_16x9 | |
| $2B_{16}$ | 480i_422liner_16x9 | |
| $2C_{16}$ | 480p_422liner_16x9 | |
| $2D_{16}$ | 480i_422liner_4x3 | |
| $2E_{16}$ | 480p_422liner_4x3 | |
| $30_{16}$ | 1080i_420planer_16x9 | |
| $31_{16}$ | 1080p_420planer_16x9 | |
| $32_{16}$ | 720p_420planer_16x9 | |
| $33_{16}$ | 480i_420planer_16x9 | |
| $34_{16}$ | 480p_420planer_16x9 | |
| $35_{16}$ | 480i_420planer_4x3 | |
| $36_{16}$ | 480p_420planer_4x3 | |
| $38_{16}$ | 1080i_420liner_16x9 | |
| $39_{16}$ | 1080p_420liner_16x9 | |
| $3A_{16}$ | 720p_420liner_16x9 | |
| $3B_{16}$ | 480i_420liner_16x9 | |
| $3C_{16}$ | 480p_420liner_16x9 | |
| $3D_{16}$ | 480i_420liner_4x3 | |
| $3E_{16}$ | 480p_420liner_4x3 | |
| $60_{16}$ | Text(ASCII) | MD-clip ASCII |
| $61_{16}$ | Text(ISO8859-1) | MD-clip modified ISO8859-1 |
| $62_{16}$ | Text(Music Shifted JIS) | MD-clip Music Shifted JIS |

FIG.8

| Valuue(MSB) | Valuue(LSB) | Type | Meaning |
|---|---|---|---|
| $00_{16}$ | $00_{16}$ | sRGB raw | sRGB raw |
| | $01_{16}$ | sRGB raw,quadlet | |
| $01_{16}$ | | | YCC raw |
| | $0X_{16}$ | YCC4:2:2 raw/chunky | |
| | $1X_{16}$ | YCC4:2:2 raw/liner | |
| | $8X_{16}$ | YCC4:2:0 raw/chunky | |
| | $9X_{16}$ | YCC4:2:0 raw/liner | |
| | $X0_{16}$ | Pixel ratio 1.00X1.00/ITU-R BT.709-2/interlace | |
| | $X1_{16}$ | Pixel ratio 1.19X1.00/ITU-R BT.709-2/interlace | |
| | $X2_{16}$ | Pixel ratio 0.89X1.00/ITU-R BT.709-2/interlace | |
| | $X3_{16}$ | Pixel ratio 0.89X1.00/ITU-R BT.601-4/interlace | |
| | $X4_{16}$ | Pixel ratio 1.07X1.00/ITU-R BT.1203/interlace | |
| | $X8_{16}$ | Pixel ratio 1.00X1.00/ITU-R BT.709-2/progressive | |
| | $X9_{16}$ | Pixel ratio 1.19X1.00/ITU-R BT.709-2/progressive | |
| | $XA_{16}$ | Pixel ratio 0.89X1.00/ITU-R BT.709-2/progressive | |
| | $XB_{16}$ | Pixel ratio 0.89X1.00/ITU-R BT.601-4/progressive | |
| | $XC_{16}$ | Pixel ratio 1.07X1.00/ITU-R BT.1203/progressive | |
| $10_{16}$ | $00_{16}$ | Exif2.1 | |
| | $01_{16}$ | JFIF | |
| | $02_{16}$ | TIFF | |
| | $0F_{16}$ | JPEG | DCF Object |
| $80_{16} \sim 8F_{15}$ | $00_{16} \sim FF_{16}$ | Vendor Dependent format | |
| $FE_{16}$ | $00_{16}$ | Unit Plug defined | Special meaning |
| | $01_{16}$ | don't care | |

FIG.9

| $Y_1(L_1)$ | $Y_2(L_1)$ | $Cb_1(L_1)$ | $Cr_1(L_1)$ |
|---|---|---|---|
| $Y_3(L_1)$ | $Y_4(L_1)$ | $Cb_3(L_1)$ | $Cr_3(L_1)$ |
| ⋮ | | | |
| $Y_{N-1}(L_1)$ | $Y_N(L_1)$ | $Cb_{N-1}(L_1)$ | $Cr_{N-1}(L_1)$ |
| $Y_1(L_2)$ | $Y_2(L_2)$ | $Cb_1(L_2)$ | $Cr_1(L_2)$ |
| ⋮ | | | |
| $Y_{N-1}(L_M)$ | $Y_N(L_M)$ | $Cb_{N-1}(L_M)$ | $Cr_{N-1}(L_M)$ |

FIG.10

| $Y_1(L_1)$ | $Y_2(L_1)$ | $Y_1(L_2)$ | $Y_2(L_2)$ |
|---|---|---|---|
| $Cb_1(L_1)$ | $Cr_1(L_1)$ | $Y_3(L_1)$ | $Y_4(L_1)$ |
| $Y_3(L_2)$ | $Y_4(L_2)$ | $Cb_3(L_1)$ | $Cr_3(L_1)$ |
| ⋮ | | | |
| $Y_{N-3}(L_{M-1})$ | $Y_{N-2}(L_{M-1})$ | $Y_{N-3}(L_M)$ | $Y_{N-2}(L_M)$ |
| $Cb_{N-3}(L_{M-1})$ | $Cr_{N-3}(L_{M-1})$ | $Y_{N-1}(L_{M-1})$ | $Y_N(L_{M-1})$ |
| $Y_{N-1}(L_M)$ | $Y_N(L_M)$ | $Cb_{N-1}(L_{M-1})$ | $Cr_{N-1}(L_{M-1})$ |

FIG.11

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Cb_1(L_1)$ | $Cr_1(L_1)$ | $Cb_3(L_2)$ | $Cr_3(L_1)$ |
| ⋮ | ⋮ | ⋮ | ⋮ |
| $Cb_{N-3}(L_1)$ | $Cr_{N-3}(L_1)$ | $Cb_{N-1}(L_1)$ | $Cr_{N-1}(L_1)$ |
| $Y_1(L_2)$ | $Y_2(L_2)$ | $Y_3(L_1)$ | $Y_4(L_1)$ |
| ⋮ | ⋮ | ⋮ | ⋮ |
| $Cb_{N-3}(L_M)$ | $Cr_{N-3}(L_M)$ | $Cb_{N-1}(L_M)$ | $Cr_{N-1}(L_M)$ |

FIG.12

| $Y_1(L_1)$ | $Y_2(L_1)$ | $Y_3(L_1)$ | $Y_4(L_1)$ |
|---|---|---|---|
| ⋮ | ⋮ | ⋮ | ⋮ |
| $Y_{N-3}(L_1)$ | $Y_{N-2}(L_1)$ | $Y_{N-1}(L_1)$ | $Y_N(L_1)$ |
| $Y_1(L_2)$ | $Y_2(L_2)$ | $Y_3(L_2)$ | $Y_4(L_2)$ |
| ⋮ | ⋮ | ⋮ | ⋮ |
| $Y_{N-3}(L_2)$ | $Y_{N-2}(L_2)$ | $Y_{N-1}(L_2)$ | $Y_N(L_2)$ |
| $Cb_1(L_1)$ | $Cr_1(L_1)$ | $Cb_3(L_1)$ | $Cr_3(L_1)$ |
| ⋮ | ⋮ | ⋮ | ⋮ |
| $Cb_{N-3}(L_1)$ | $Cr_{N-3}(L_1)$ | $Cb_{N-1}(L_1)$ | $Cr_{N-1}(L_1)$ |
| $Y_1(L_3)$ | $Y_2(L_3)$ | $Y_3(L_3)$ | $Y_4(L_3)$ |
| ⋮ | ⋮ | ⋮ | ⋮ |
| $Cb_{N-3}(L_{M-1})$ | $Cr_{N-3}(L_{M-1})$ | $Cb_{N-1}(L_{M-1})$ | $Cr_{N-1}(L_{M-1})$ |

FIG.13

| Address Offset | 1st byte | 2nd byte | 3rd byte | 4th byte |
|---|---|---|---|---|
| 00 00 00 00₁₆ | Y1(L1) | Y2(L1) | Cb1(L1) | Cr1(L1) |
| 00 00 00 04₁₆ | Y3(L1) | Y4(L1) | Cb3(L1) | Cr3(L1) |
| ... | | | | |
| 00 00 05 9C₁₆ | Y719(L1) | Y720(L1) | Cb719(L1) | Cr719(L1) |
| 00 00 05 A0₁₆ | Y1(L2) | Y2(L2) | Cb1(L2) | Cr1(L2) |
| ... | | | | |
| 00 0A 8B FC₁₆ | Y719(L480) | Y720(L480) | Cb719(L480) | Cr719(L480) |

FIG.14

| Address Offset | 1st byte | 2nd byte | 3rd byte | 4th byte |
|---|---|---|---|---|
| 00 00 00 00₁₆ | Y1(L1) | Y2(L1) | Y1(L2) | Y2(L2) |
| 00 00 00 04₁₆ | Cr1(L1) | Cr1(L1) | Y3(L1) | Y4(L1) |
| 00 00 00 08₁₆ | Y3(L2) | Y4(L2) | Cb3(L1) | Cr3(L1) |
| ... | | ... | | |
| 00 07 E8 F8₁₆ | Cb717(L479) | Cr717(L479) | Y719(L479) | Y720(L479) |
| 00 07 E8 FC₁₆ | Y719(L480) | Y720(L480) | Cb719(L479) | Cr719(L479) |

FIG.15

| Address Offset | 1st byte | 2nd byte | 3rd byte | 4th byte |
|---|---|---|---|---|
| 00 00 00 00₁₆ | Y1(L1) | Y2(L1) | Y3(L1) | Y4(L1) |
| ... | | | | |
| 00 00 02 CF₁₆ | Y717(L1) | Y718(L1) | Y719(L1) | Y720(L1) |
| 00 00 02 D0₁₆ | Cb1(L1) | Cr1(L1) | Cb3(L1) | Cr3(L1) |
| ... | | | | |
| 00 00 05 9F₁₆ | Cb717(L1) | Cr717(L1) | Cb719(L1) | Cr719(L1) |
| 00 00 05 A0₁₆ | Y1(L2) | Y2(L2) | Y3(L2) | Y4(L2) |
| ... | | | | |
| 00 0A 8B FC₁₆ | Cb717(L480) | Cr717(L480) | Cb719(L480) | Cr719(L480) |

FIG.16

| Address Offset | 1st byte | 2nd byte | 3rd byte | 4th byte |
|---|---|---|---|---|
| 00 00 00 00 $_{16}$ | Y1(L1) | Y2(L1) | Y3(L1) | Y4(L1) |
| ... | | | | |
| 00 00 02 CF $_{16}$ | Y717(L1) | Y718(L1) | Y719(L1) | Y720(L1) |
| 00 00 02 D0 $_{16}$ | Y1(L2) | Y2(L2) | Y3(L2) | Y4(L2) |
| ... | | | | |
| 00 00 05 9F $_{16}$ | Y717(L2) | Y718(L2) | Y719(L2) | Y720(L2) |
| 00 00 05 A0 $_{16}$ | Cb1(L1) | Cr1(L1) | Cb3(L1) | Cr3(L1) |
| ... | | | | |
| 00 00 08 6F $_{16}$ | Cb717(L1) | Cr717(L1) | Cb719(L1) | Cr719(L1) |
| 00 00 08 70 $_{16}$ | Y1(L3) | Y2(L3) | Y3(L3) | Y4(L3) |
| ... | | | | |
| 00 07 E8 FC $_{16}$ | Cb717(L479) | Cr717(L479) | Cb719(L479) | Cr719(L479) |

FIG.17

| | msb | | | | | | | | lsb |
|---|---|---|---|---|---|---|---|---|---|
| opcode | PRINTER STATUS2(53₁₆) | | | | | | | | |
| operand[0] | reserved | | | | | | | | |
| operand[1] | status | | | | | | | | |
| operand[2] | | | | | | | | | |
| operand[3] | reserved | | | | | | | | |
| operand[4] | Current_print_job_ID | | | | | | | | |
| operand[5] | | | | | | | | | |
| ... | | | | | | | | | |
| operand[16] | | | | | | | | | |
| operand[17] | warning | | | | | | | | |
| operand[18] | reserved | | | | | | | | |
| operand[19] | | | | | | | | | |
| operand[20] | | | | | | | | | |

FIG.18

| address offset | msb | | | | | | | lsb |
|---|---|---|---|---|---|---|---|---|
| 00₁₆ | colorant_Empty | Cover-open | Jummed | Head-error | Small-paper | No_cartridge | occupied | testing |
| 01₁₆ | Warmup | Reserved | | | | | | |

FIG.19

| value | Symbol | Meaning |
|---|---|---|
| $80_{16}$ | colorant_Empty | COLOR MATERIAL(Dye/Ink/Ribbon/Toner)empty. 0=No error,1=Empty |
| $40_{16}$ | Cover_open | COVER OPENED 0=No error,1=Open |
| $20_{16}$ | jummed | PAPER STUFFING 0=No error,1=Jummed |
| $10_{16}$ | Head_error | HEAD NOT OPERABLE 0=No error,1=Error |
| $08_{16}$ | Small_paper | SMALL PAPER SIZE 0=No error,1=Small |
| $04_{16}$ | No_cartridge | NO CARTRIDGE 0=No error,1=No cartridge |
| $02_{16}$ | occupied | FROM OTHER I/F 0=Not occupied,1=Occupied |
| $01_{16}$ | testing | TESTING ON 0=Not testing,1=In testing |
| $80_{16}$ | Warmup | NOT READY |

FIG.20

| value | Symbol | Meaning |
|---|---|---|
| 80₁₆ | media_almost_empty | PAPER almost empty. 0=No error,1=Empty |
| 80₁₆ | colorant_almost_empty | COLOR MATERIAL (Dye/Ink/Ribon/Toner)almostempty. 0=No error,1=Empty |

FIG.22

IMAGE PROCESSING METHOD AND APPARATUS, PRINTING METHOD AND APPARATUS, IMAGE PRINTING SYSTEM AND METHOD AND RECORDING MEDIUM

BACKGROUND OF THE INVENTION

1. Field of the Invention

This invention relates to an image processing method and apparatus suitably employed in an image printing apparatus employing a printer connected in circuit over an interface conforming to the IEEE (The Institute of Electrical and Electronics Engineers) 1394 standard. This invention also relates to an image printing method and apparatus, an image printing system, an image printing method, and to a storage medium having stored therein an image processing and printing program.

2. Description of Related Art

The IEEE (The Institute of Electrical and Electronics Engineers) 1394 standard provides for the physical standard and the electrical standard for connectors for interconnection provided in respective equipments. The equipments provided with an interface pursuant to the IEEE 1394 standard are physically interconnected to realize e.g., the hot plug and play automatically executing high-speed digital data transmission/reception and connection setting between the respective equipments, such that the IEEE 1394 standard is widespread as the serial interface standard of the relevant technical field.

Moreover, this IEEE 1394 standard is widespread not only in the field of a computer but also as an interface interconnecting AV equipments. Specifically, when a STB (set top box), receiving the satellite broadcast to display the received broadcast on a television device, and a printer device, printing an image, are interconnected over an IEEE 1394 interface, the STB controls the printer apparatus using an FCP (function control protocol) and AV/C protocol. The STB and the printer device mount an FCP and an AV/C protocol, and operate in accordance with FCP and AV/C commands.

In a conventional image printing system, provided with a printing device mounting an FCP and the AV/C protocol, interconnected by the IEEE 1394 interface, and with a controller controlling the printer device, a command packet containing a printer status command (PRINTER STATUS) is transmitted from the controller to the printer device, and a corresponding response is acquired, while printing is going on in the printer device, to recognize the printing state of the printer device on the side controller.

In the response transmitted from the printer device to the side controller, there are stored such information as the information specifying whether or not there is a printing sheet (Empty), the information indicating whether the printer device is on-line or off-line (Line), the information indicating whether or not the printer device is operable (Fatal), and the information indicating whether or not the operating state of the printer device is recoverable (Recoverable). These information are recognized by the side controller.

It has also been proposed in the Japanese Laying-Open Patent H-10-229534 to transmit a response from the printer device to the controller to display an error that has occurred on the side printer device.

However, no consideration has been given as to how the state of the printer device is to be transmitted/received between the printer device and the controller.

SUMMARY OF THE INVENTION

It is therefore an object of the present invention to provide an image processing method and apparatus in which the image processing apparatus is connected to the printer device over an interface pursuant to the IEEE 1394 standard to transmit/receive the information indicating the detailed printing state to prompt a user to take proper measures.

It is another object of the present invention to provide a printing method and apparatus in which the printing apparatus is connected to the image processing apparatus over an interface pursuant to the IEEE 1394 standard to transmit/receive the information indicating the detailed printing state to prompt a user to take proper measures.

It is still another object of the present invention to provide an image printing method and an image printing system in which the image processing apparatus and the printer device are interconnected over an interface pursuant to the IEEE 1394 standard to transmit/receive information indicating the detailed printing state to prompt a user to take proper measures.

It is yet another object of the present invention to provide a recording medium having stored therein an image processing program and a printing program, in which the image processing program and the printing program are such a one by means of which the information indicating the detailed printing state can be transmitted/received between equipments interconnected over an interface pursuant to the IEEE 1394 standard to enable a user to take proper measures.

Meanwhile, the present Assignee proposed for the IEEE 1394 Trade Association the contents of the JP Patent Application No. H-11-233254, based on which the priority rights of the present application have been asserted, for standardization. The contents of these proposals were laid open in the IEEE 1394 Trade Association as the following drafts:

AV/C Printer Subunit Specification Version 1.0 Draft 0.97:60 (2Q00 AVWG Off-Cycle Meeting on May 24–25, 2000);

AV/C Printer Subunit Specification Version 1.0 Draft 0.7:5 (1Q00 TA QM AV-WG on Jan. 18, 2000); and AV/C Printer Subunit Specification Version 1.0 Draft 0.5:145 (3Q99 TA QM AVWG Meeting on Jul. 28–30, 1999).

In accordance with the present invention, there is provided an image processing method and apparatus in which desired still image data corresponding to image data inputted from outside are generated, the printing state request information requesting the printing state information indicating the printing state of a printing device is generated, the still image data generated in the image processing means are included in a packet pursuant to the IEEE (The Institute of Electrical and Electronic Engineers) 1394 standard to output the resulting packet, the printing state information request generated by the printing state information request generating means by the AV/C command set consistent with the FCP (Function Control Protocol) pursuant to the IEEE 1394 standard is defined and the resulting request is outputted to the printing device. The printing state is presented to the user in accordance with the printing state information. So, by acquiring the response to the printing state information request, it is possible to transmit/receive the information indicating a more detailed printing state to optimally present the printing state of the printing device to the user.

In accordance with the present invention, there is also provided a printing method and apparatus in which still image data contained in a packet pursuant to the IEEE (The Institute of Electrical and Electronics Engineering) 1394 standard and a printing state information request defined by the AV/C command set consistent with an FCP (Function Control Protocol) pursuant to the IEEE 1394 standard are inputted, the input still image data is printed and the printing state information indicating the printing state is generated responsive to the input printing state information request to output the printing state information in accordance with the FCP. So, by acquiring the response to the printing state information request, it is possible to transmit/receive the information indicating a more detailed printing state to optimally present the printing state of the printing device to the user.

In accordance with the present invention, there is also provided an image printing method system and an image printing method wherein, on an image processing device side, desired still image data corresponding to image data inputted from outside are generated, the printing state request information which requests the printing state information indicating the printing state of the printing device is generated, the generated still image data is contained in a packet pursuant to the IEEE (The Institute of Electrical and Electronics Engineering) 1394 standard, and the resulting packet is outputted to the printing device, whilst the generated printing state information request is defined in an AV/C command set consistent with an FCP (Function Control Protocol) pursuant to the IEEE 1394 standard to output the resulting defined printing state to the printing device, whereas, on a printing device side, still image data outputted by the image processing apparatus and a printing state information request are inputted, the input still image data is printed, and the generated printing state information indicating the printing state of the printing device is outputted responsive to the input printing state information request to the image processing apparatus in accordance with the FCP. On the image processing side, the printing state information transmitted from the printing device in accordance with an FCP is received and the printing state is presented to a user in accordance with the printing state information. So, by acquiring the response to the printing state information request, it is possible to transmit/receive the information indicating a more detailed printing state to optimally present the printing state of the printing device to the user.

In accordance with the present invention, there is apso provided a recording medium having stored therein an image processing program, which image processing program includes generating desired still image data corresponding to image data inputted from outside, generating the printing state request information which requests the printing state information indicating the printing state of the printing device, having the generated still image data contained in a packet pursuant to the IEEE (The Institute of Electrical and Electronics Engineering) 1394 standard to output the resulting packet to the printing device, simultaneously defining the generated printing state information request in an AV/C command set consistent with an FCP (Function Control Protocol) pursuant to the IEEE 1394 standard to output the resulting defined printing state information request to the printing device, and receiving the printing state information transmitted from the printing device in accordance with the FCP and presenting the printing state to the user in accordance with the printing state information. So, by acquiring the response to the printing state information request, it is possible to transmit/receive the information indicating a more detailed printing state to optimally present the printing state of the printing device to the user.

In accordance with there is also provided a recording medium having stored therein an image processing program, which image processing program includes inputting still image data contained in a packet pursuant to the IEEE (The Institute of Electrical and Electronics Engineering) 1394 standard and a printing state information request defined by the AV/C command set consistent with an FCP (Function Control Protocol) pursuant to the IEEE 1394 standard, printing still image data inputted to the inputting means, generating the printing state information indicating the printing state responsive to the input printing state information request to output the printing state information in accordance with the FCP. So, by acquiring the response to the printing state information request, it is possible to transmit/receive the information indicating a more detailed printing state to optimally present the printing state of the printing device to the user.

BRIEF DESCRIPTION OF THE DRAWINGS

FIG. 6 illustrates an image type of a still image.

FIG. 7 illustrates a data structure of an asynchronous packet containing a capture command.

FIG. 8 illustrates the appellation of an image type stored in the image_format_specifier.

FIG. 9 illustrates another example of an image type stored in the image_format_specifier.

FIG. 10 illustrates an image data transmitting sequence in point-sequentially transmitting still image data of the YCC 4:2:2 pixel format to the printing device.

FIG. 11 illustrates an image data transmitting sequence in point-sequentially transmitting still image data of the YCC 4:2:0 pixel format to the printing device.

FIG. 12 illustrates an image data transmitting sequence in line-sequentially transmitting still image data of the YCC 4:2:2 pixel format to the printing device.

FIG. 13 illustrates an image data transmitting sequence in line-sequentially transmitting still image data of the YCC 4:2:0 pixel format to the printing device.

FIG. 14 illustrates point-sequential transmission of a still image with an image type of 480_422_4×3.

FIG. 15 illustrates point-sequential transmission of a still image with an image type of 480_420_4×3.

FIG. 16 illustrates line-sequential transmission of a still image with an image type of 480_422_4×3.

FIG. 17 illustrates line-sequential transmission of a still image with an image type of 480_420_4×3.

FIG. 18 is a flowchart for illustrating the processing sequence of the printing processing performed in a printing device of the image printing system embodying the present invention.

FIG. 19 illustrates the contents of a status contained in a printer status 2 command.

FIG. 20 illustrates the meaning and contents of each setting item contained in the status.

FIG. 22 illustrates the meaning and the contents of each setting item contained in the warning.

DESCRIPTION OF THE PREFERRED EMBODIMENTS

Figure 1:
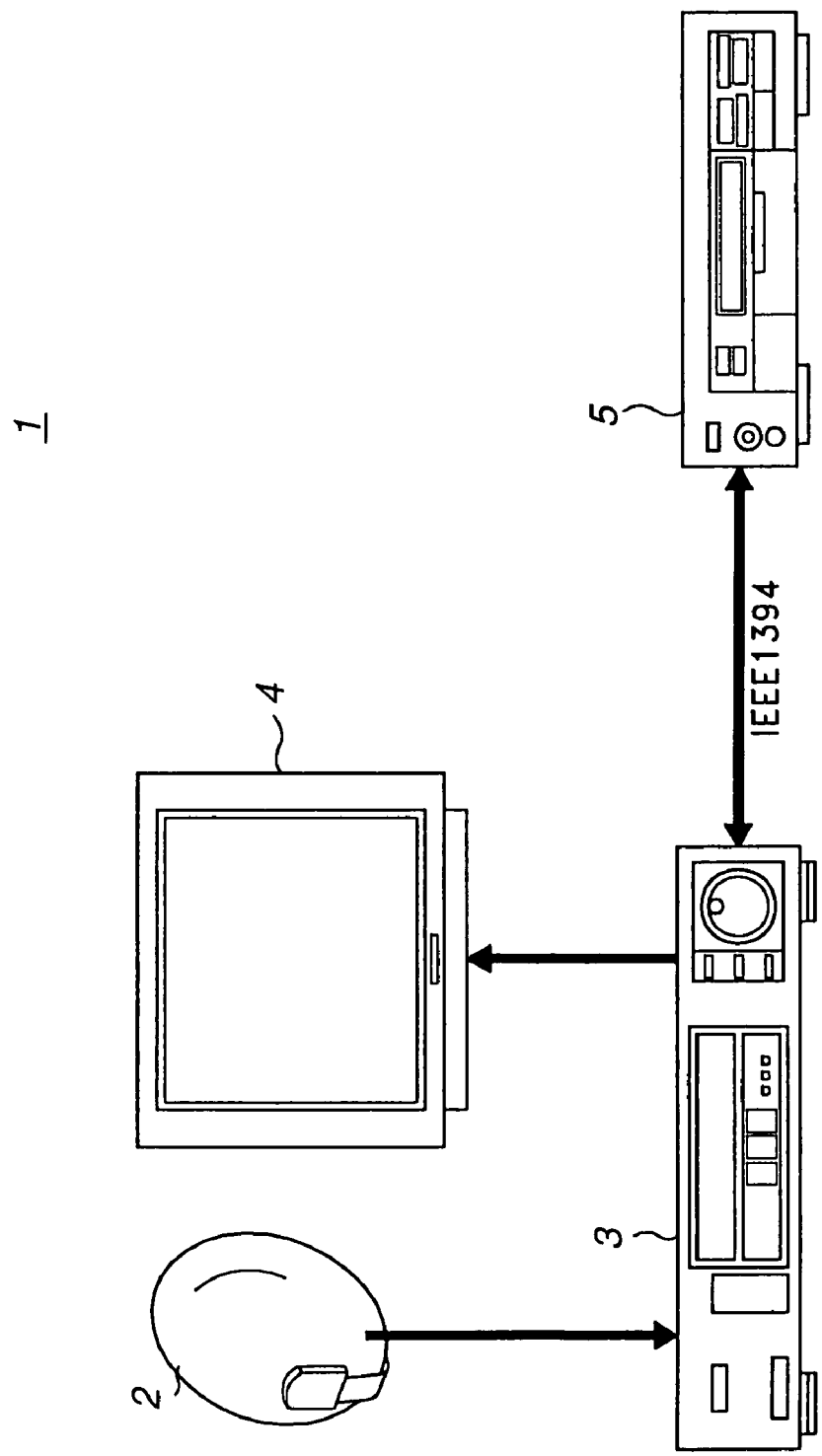
FIG. 1 illustrates an image printing system embodying the present invention.

Referring to the drawings, preferred embodiments of the present invention will be explained in detail.

An image printing system 1, embodying the present invention is configured as shown for example in FIG. 1.

This image printing system 1 is made up of an antenna 2 for receiving a moving picture broadcast using e.g., a communication satellite, a set top box (STB) 3 for processing the received moving picture data in a pre-set fashion, a television device 4 for displaying moving pictures and an still image and a printing device 5 for printing and outputting an image.

The antenna 2 receives image signals representing a moving picture to output the image signals to the STB 3. The image signal, received by the antenna 2, has multi-channel image signals superposed thereon. The image signal is comprised of moving picture data compressed in accordance with e.g., the MPEG (Moving Picture Experts Group) system and which is ciphered in accordance with a pre-set encryption system.

The television device 4 is fed with moving picture data of the NTSC (National Television System Committee) system through the STB 3 to display moving pictures. Moreover, if the television device 4 is the HD (high definition) TV, moving picture data pursuant to the HD standard are fed from the STB 3 to display moving pictures. In addition, this television device 4 has the display state controlled by the STB 3 to display a still image and other letter information.

Figure 2:
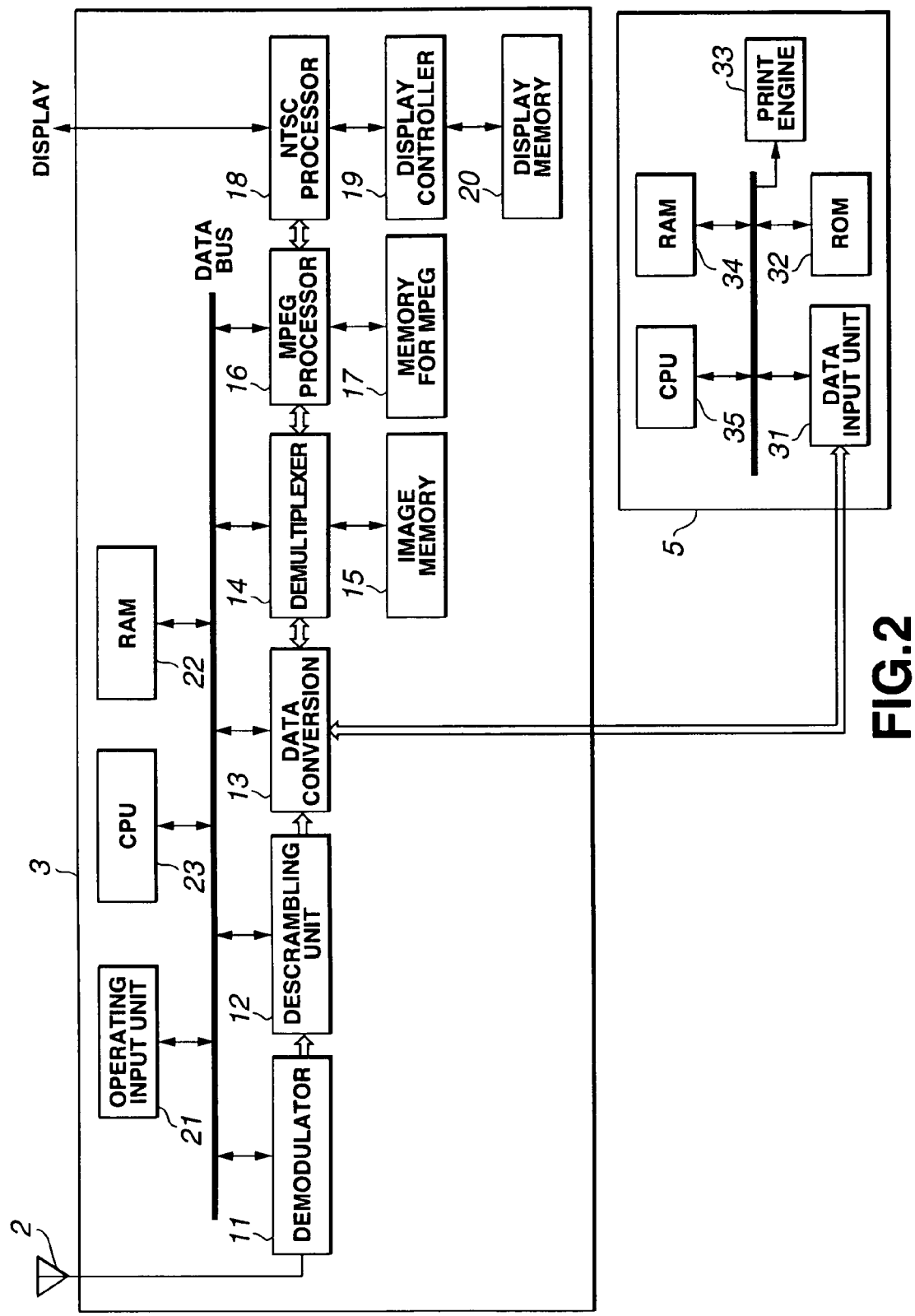
FIG. 2 is a block diagram showing the structure of an STB and a printer apparatus constituting an image printing system embodying the present invention.

Referring to FIG. 2, the STB 3 includes a demodulator 11 for demodulating picture signals received over the antenna 2, a descrambling unit 12 for deciphering the moving picture data, a data conversion unit 13 for performing data conversion pursuant to the IEEE 1394 standard, a demultiplexer 14 for extracting moving picture data in a pre-set channel, an image memory 15, an MPEG processor 16 for performing decoding, a decoding memory 17, an NTSC processor 18 for performing data conversion for display on the television device 4, a display controller 19, and a display memory 20. The STB 3 also includes an operation inputting unit 21, for inputting a command from a user, a RAM (random access memory) 22 and a CPU (central processing unit) 23 for controlling various components.

This STB 3 has the demodulator 11, descrambling unit 12, data conversion unit 13, demultiplexer 14, MPEG processor 16, operation inputting unit 21, RAM 22 and the CPU 23 connected to the bus so that the processing operations of the variable portions will be controlled by the CPU 23 over the bus.

To the demodulator 11 are fed picture signals of the analog system specifying a moving picture stream from the antenna 2. This demodulator 11 processes the picture signals from the antenna 2 with demodulation and A/D conversion to generate digital moving picture data which is outputted to the descrambling unit 12. The demodulator 11 is also fed over the bus with control signals from the CPU 23 to perform demodulation and A/D conversion based on the control signals.

The descrambling unit 12 decrypts the moving picture data from the demodulator 11. That is, the descrambling unit 12 is fed with ciphered moving picture data to perform deciphering in accordance with the encryption system of the input moving picture data. The descrambling unit 12 outputs the deciphered moving picture data to the data conversion unit 13. This descrambling unit 12 is fed from the CPU 23 with the control signals over the bus and performs decryption using the encryption key information contained in the control signals.

The data conversion unit 13 is comprised of an interfacing circuit, in meeting with e.g., the IEEE 1394 standard, and is responsive to the control signals from the descrambling unit 12, in accordance with the IEEE 1394 standard, to process the input moving picture data or still image data such as to have the input moving picture data or still image data contained in a packet pursuant to the IEEE 1394 standard. In transmitting temporally continuous data, such as moving picture data, the data conversion unit 13 generates an isochronous packet, whereas, in transmitting static data, such as still image data or connection setting data, the data conversion unit 13 generates an asynchronous packet 100, as shown in FIG. 3.

Figures 3, 4:
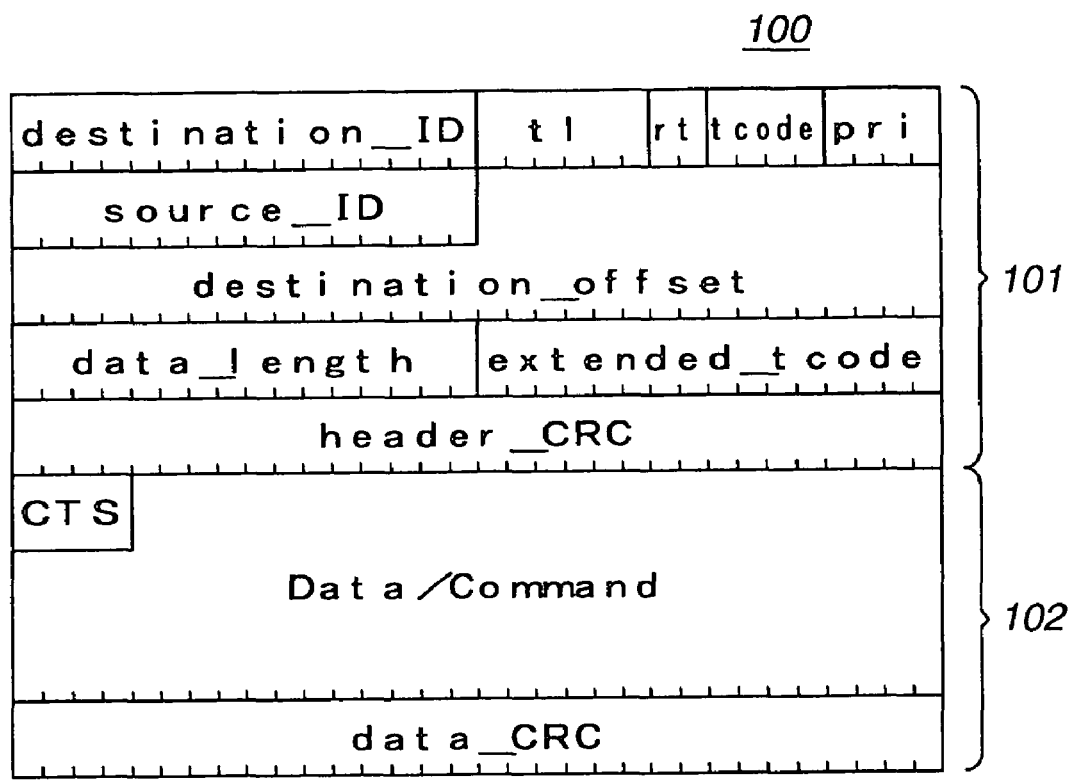
FIG. 3 illustrates a data structure of an asynchronous packet transmitted/received between the STB and the printer device.
FIG. 4 is a plan view showing a data structure of a data portion of the asynchronous packet.

This asynchronous packet 100, shown in FIG. 3, includes a header 101, pursuant to the IEEE 1394 standard, and a data portion 102.

In the header 101 are stored an ID of a packet receiving side, that is a destination ID (destination_ID) of the printing device 5, a transaction label (tl), a retry code (rt), a transaction code (tcode), priority (pri), an ID of a packet transmitting side, that is a transmitting side ID (source_ID) specifying an ID of the packet transmitting side, that is STB 3, destination_offset specifying a memory address of the packet receiving side, a data field length (data_length), an extended transaction code (extended_tcode) and a header CRC (header_CRC; CRC of the header field) indicating the CRC for the header 101.

In the data portion 102 are stored a data field and a data CRC (data_CRC) indicating the CRC for the header 102. In the data field are stored data in meeting with FCP (function control protocol) and the AV/C protocol.

In the data field are stored the CTS (command transaction set), command type, a subunit type (subunit_type) indicating the subunit type of the packet reception side, and a subunit ID (subunit_ID) indicating the ID of the type of the subunit of the packet receiving side, as shown in FIG. 4. The subunit of the packet receiving side corresponds to a data inputting unit 31 of the printing device 5, whilst the type of the subunit of the packet receiving side is represented by "00010" in the case of the printing device 5.

In the data field, still image data (data) transmitted to the printing device 5 and a command (command) to the printing device 5 are stored in succession to the sub-unit ID. The command to be stored in the data field is a command contained in a command set, called an AV/C command, for controlling the printing device 5. The CTS classes the types of the FCP. If the packet to be transmitted is a command, and has a value 0000, an AV/C command, defined in the AV/C digital interface command set of IEEE 1394, is stored in the data field of the data portion 102.

When outputting an asynchronous packet, the data conversion unit 13 transmits it at regular intervals.

Figure 5:
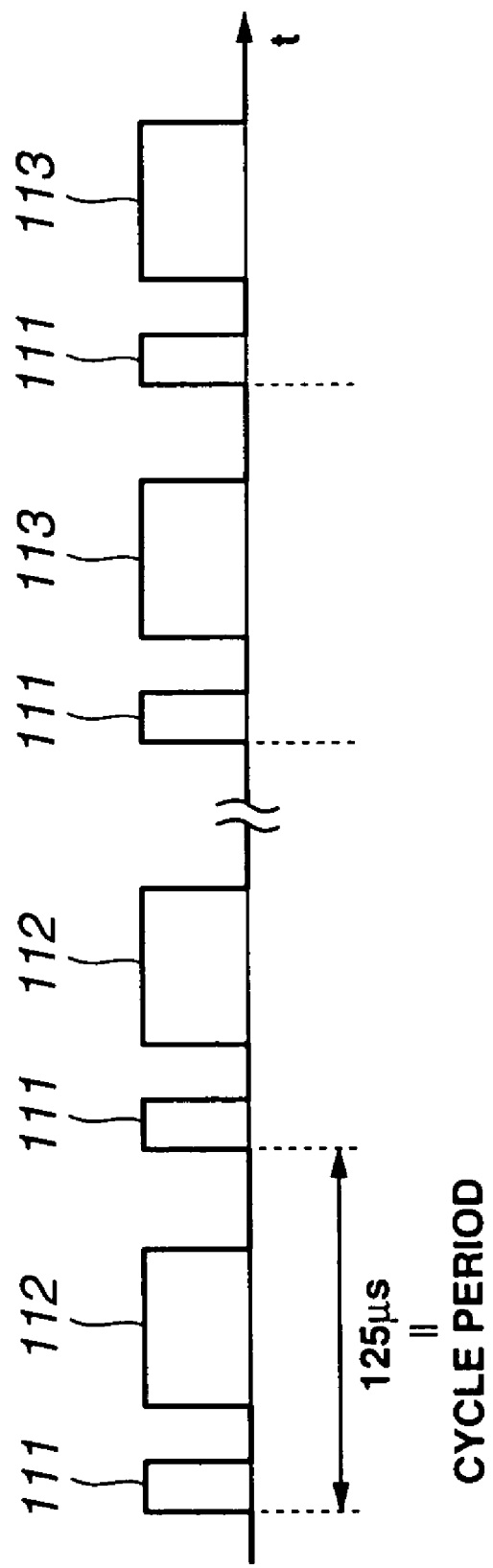
FIG. 5 is a timing chart in transmitting an asynchronous packet from a data conversion unit to a data input unit.

When the data conversion unit 13 causes still image data printed by the printing device 5 to be included in the asynchronous packet 100, for transmission, the data conversion unit 13 transmits the asynchronous packet 100 at a cycle period of 125 μsec, as shown in FIG. 5. The data conversion unit 13 first transmits a cycle start packet 111, which is the asynchronous packet 100 including cycle time data (cycle_time_data) indicating the cycle start (cycle_start) and, via a pre-set time gap, sends a command packet 112 including a capture command in the data portion 102 indicating the effect that still image data, for example, is to be sent. At each cycle period, the data conversion unit 13 sends a data packet 113, which has stored still image data in the data portion 102, to the printing device 5, which has received the capture command.

When outputting still image data to the printing device 5, the data conversion unit 13 follows an asynchronous arbitration. When outputting the still image data to the printing device 5, the data conversion unit 13 outputs each asynchronous packet 100, including still image data, responsive to a response from the printing device 5.

Specifically, this data conversion unit 13 performs processing in the transaction layer, link layer and in the physical layer under serial management pursuant to the IEEE 1394 standard. Thus, the data conversion unit 13 sets the connection to the printing device 5, under control by the CPU 23, and generates the asynchronous packet 100, including still image data and an overhead, as the control information, to transmit the asynchronous packet 100 at each cycle period to the printing device 5, connected in circuit, in accordance with the IEEE 1394 standard, by way of performing time divisional control.

When directly displaying the moving picture data, received by the STB 3, by the television device 4, without performing the processing pursuant to the IEEE 1394 standard, the data conversion unit 13 outputs moving picture data from the descrambling unit 12 to the demultiplexer 14, based on the control signal from the CPU 23.

The demultiplexer 14 performs channel selection processing of selecting the channel selected by the CPU 23, from the plural channels superposed on the moving picture data from the data conversion unit 13, to output only the moving picture data, indicating the designated channel, to the MPEG processor 16.

The demultiplexer 14 is fed from the MPEG processor 16 with still image data, composed of the luminance information and the chroma information, under control by the CPU 23, and stores the still image data in the image memory 15 to output the stored data to the data conversion unit 13 under control by the CPU 23.

Based on the control signal from the CPU 23, the MPEG processor 16 decodes the moving picture data from the demultiplexer 14, in accordance with the MPEG standard, to process the moving picture data into non-compressed moving picture data, which is outputted to the NTSC processor 18. The MPEG processor 16 processes each frame constituting a moving picture into an image composed of pixel data containing the luminance information Y and the chroma information Cr, Cb. At this time, the MPEG processor 16 stores the moving picture data being decoded, with plural frames of the moving picture data as a unit, from time to time, in the memory for MPEG 17, as the MPEG processor 16 uses the memory for MPEG 17 as a work area.

The MPEG processor 16 generates a YCC image of a 4:2:2 pixel format in which the sampling frequency ratio of the luminance information Y, chroma information Cr and the chroma information Cb is set to 4:2:2, that is in which the chroma information Cr, Cb is reduced to one half of the luminance information Y in the vertical or horizontal direction. The MPEG processor 16 also generates a YCC image of a 4:2:0 pixel format in which the chroma information Cr, Cb is reduced to one half the luminance information Y in the vertical and horizontal directions. In the 4:2:0 pixel format, an odd line is free of the chroma information Cb to provide the sampling frequency ratio of 4:2:0, whereas the even line is free of the chroma information Cr to provide the sampling frequency ratio of 4:0:2. This pixel format is represented by 4:2:0. It is possible for the MPEG processor 16 to generate a YCC image of a 4:4:4 pixel format, in which the chroma information Cr, Cb is not curtailed, in place of the 4:2:2 or 4:2:0.

Based on the control signal indicating the compression ratio etc from the CPU 23, the MPEG processor 16 encodes the moving picture data from the NTSC processor 18, in accordance with the MPEG standard, to compress the moving picture data in the time axis direction and in the spatial direction, to output the resulting compressed moving picture data to the demultiplexer 14. At this time, the MPEG processor 16 stores moving picture data, being encoded, in the memory for MPEG 17, with plural frames of the moving picture data as a unit.

The NTSC processor 18 encodes the moving picture data, inputted from the MPEG processor 16, into moving picture data of the NTSC system, that can be displayed on the television device 4, to output the resulting moving picture data to the television device 4.

The display controller 19 processes the moving picture data inputted from the MPEG processor 16 for display on the television device 4. The display controller 19 causes the data for processing to be stored from time to time in the display memory 20.

Specifically, this display controller 19 manages control to set the image size of an image displayed on the television device 4, from one frame displayed on the television device 4 to another, to 720 by 480 pixels of the NTSC system or to 1920 horizontal pixels by 1080 vertical pixels of the HD (high definition) system, depending on the type of the television device 4. In generating one-pixel data, the display controller 19 outputs the one-pixel data to the television device 4 using the 16-bit information used in the 4:2:2 pixel format in which the sampling frequency ratio of the luminance signal Y, chroma signal Cr and the chroma signal Cb is 4:2:2, or using the information used in the 4:2:0 pixel format in which the sampling frequency ratio of the luminance signal Y, chroma signal Cr and the chroma signal Cb is 4:2:0.

It is possible for the display controller 19 to output an image of the image type, which has defined the image size (pixel_x, pixel_y), scanning system (interlaced/progressive), pixel format, screen aspect ratio, pixel aspect ratio and data volume (image size), instead of outputting data by the above-described system, as shown in FIG. 6. In this figure, the image type with the pixel_y of 720 pixels, the pixel format of 4:2:2 and with the screen aspect ratio of 16:9, is termed 720_422_16×9. It is noted that the display controller 19 also is able to generate an image of 720_422_16×9 and an image of 720_420_16×9, which is the image type of the digital TV broadcasting system used in USA. The display controller 19 is also able to generate an image of 576_422_4×3 and an image of 522_420_4×3, which is the image type of the PAL (phase alternation by line) system.

When the user acts on an actuating button provided on e.g., the STB 3, the operation inputting unit 21 generates an operation input signal to output the signal to the CPU 23. Specifically, subject to actuation of the operating button etc by the user, the operation inputting unit 21 generates an operating input signal instructing the moving picture displayed on the television device 4 to be temporarily halted to print a still image by the printing device 5.

Based on the operating input signal from the operation inputting unit 21, the CPU 23 generates a control signal controlling the above-mentioned respective parts of the STB 3.

If the picture signals received over the antenna 2 are displayed on the television device 4, the CPU 23 outputs a control signal to each of the demodulator 11, descrambling unit 12, data conversion unit 13, demultiplexer 14 and the MPEG processor 16 to manage control to process the moving picture data with demodulation, decryption, channel selection and with decoding in meeting with the MPEG standard.

If, of the moving pictures displayed on the television device 4, a frame-based still image is to be captured by an operating input signal from the operation inputting unit 21, the CPU 23 generates a control signal to read-in the frame-based still image stored in the display memory 20 at a time point of inputting the operating input signal in the image memory 15.

When fed with an operating input signal instructing the printing device 5 to print a picture which has yielded still image data, the CPU 23 controls the demultiplexer 14 and the data conversion unit 13 to output a YCC image, as a frame-based still image data stored in the image memory 15, composed of the luminance information L and the chroma information Cr, Cb, to the printing device 5 via the data conversion unit 13 as the interfacing circuit pursuant to the IEEE 1394 standard.

When transmitting still image data to the printing device 5, under control by the CPU 23, the data conversion unit 13 sends the asynchronous packet 100, having stored therein a capture command shown in FIG. 7, in succession to the subunit ID shown in FIG. 4, under control by the CPU 23, to transmit the capture command for receiving the still image data to the printing device 5.

In the capture command, shown in FIG. 7, a capture command, represented in hexadecimal $XX_{16}$, is stored as an opcode (operation code). Then, a subfunction is stored as operand [0], source_subunit_type and source_subunit_ID are stored in the upper 5 bits and in the lower 3 bits, as an operand [1], respectively, source_plug is stored as operand [2], status is stored as operand [3] and dest_plug is stored as operand [4]. In the capture command, print_job_ID is stored as operand [5] to operand [16], data_size is stored as operand [17] to operand [20], image_size_x is stored as operand [21] to operand [22], image_size_y is stored as operand [23] to operand [24], image_format_specifier is stored as operand [25], operand [27] to operand [29] are set as reserved, Next_pic is stored as operand [30] and Next_page is stored as operand [31] to operand [32].

The source_subunit_type is the information specifying the type of the subunit transmitting the asynchronous packet 100 on the side STB 3. The source_subunit_ID is an ID of the subunit transmitting the asynchronous packet 100. The source_plug is a plug number of the subunit transmitting the asynchronous packet 100. The dest_plug is the plug number of the subunit receiving the asynchronous packet 100. The print_job_ID is the ID of the processing (job) of printing a sill image. The data_size is the date volume transmitted from the STB 3 to the printing device 5 when printing a still image by the printing device 5. The image_size_x is the number of pixels in the x-direction corresponding to the image type shown in FIG. 6. The image_size_y is the number of pixels in the y-direction corresponding to the image type. The image_format_specifier is the appellation of the above image type. The reserved is made up of an optional number of bits and is provided in order that the number of bits of the capture command in its entirety will be a multiple of 4. By providing the reserved, the number of bits is convenient for the data unit when transmitting the packet pursuant to the IEEE 1394 standard.

In the image_format_specifier, the appellation of the image type is stored as it is identified by hexadecimal values, as shown in FIG. 8. In this figure, "chunky" in the appellation of the image type denotes that the image is the still image transmitted point-sequentially from the data conversion unit 13 to the printing device 5, whereas "liner" denotes that the image is the still image transmitted line-sequentially from the data conversion unit 13 to the printing device 5

It is also possible for the image_format_specifier to contain not only the appellation of the image type, as shown in FIG. 8, but also the appellation of the image type expressed by the hexadecimal value (sub-value) and not containing the information pertinent to the number of pixels, as shown in FIG. 9, in distinction from the image type shown in FIG. 8. At this time, the number of pixels printed by the printing device 5 is defined by the image_size_x described in the operand [21] and operand [22] and by the image_size_y described in the operand [23] and operand [24] of the capture command shown in FIG. 7.

For example, 00 in hexadecimal, stated in the msb of the image_format_specifier (meaning: sRGB raw), indicates that the image data is transmitted as RGB data to the printing device 5. Moreover, if 00 in hexadecimal is stated in the msb of the image_format_specifier, RGB data are transmitted in the order of R, G, B, R, G, B, . . . when 00 in hexadecimal is stated in its lsb (Type: sRGB raw), and in the order of R, G, B, 0, R, G, B, 0, . . . when 01 in hexadecimal is stated in its lsb (Type: sRGB raw, quadlet). That is, if 00 is stated in the msb, data 0 is transmitted between B and R to transmit R, G, B, 0 as one-unit 4-byte data.

Also, if 01 in hexadecimal is stated in the msb of the image_format_specifier (meaning: YCC raw), it indicates that image data is to be sent as YCC data to the printing device 5. If 01 is stated in hexadecimal in the msb of the image_format_specifier, it indicates that the luminance information and the chroma information are to be transmitted point-sequentially (chunky) as 4:2:2 pixel format data in case 0X is stated in the lsb (type: YCC 4:2:2 raw/pixel); that the luminance information and the chroma information are to be transmitted line-sequentially (liner) as 4:2:2 pixel format data in case 1X is stated in the lsb (type: YCC 4:2:2 raw/line); that the luminance information and the chroma information are to be transmitted point-sequentially (chunky) as 4:2:0 pixel format data in case 8X is stated in the lsb (type: YCC 4:2:2 raw/chunky); and that the luminance information and the chroma information are to be transmitted line-sequentially (liner) as 4:2:0 pixel format data in case 9X is stated in the lsb (type: YCC 4:2:0 raw/line), where X is an indefinite number.

If 01 is stated in hexadecimal in the msb of the image_format_specifier (meaning: YCC raw), and X0 to XC in hexadecimal is stated in its lsb, the pixel ratio (pixel ratio 1.00×1.00, pixel ratio 1.19×1.00 or the pixel ratio 0.89× 1.00), the color space (ITU-R (International Telecommunications Union-Radiocommunication Sector) BT. 709-2, ITU-R BT. 601-4 or ITU-R BT. 1203), point-sequential (chunky) or line-sequential (liner) is specified to transmit the data. If X0 to X4 in hexadecimal or X8 to XC in hexadecimal is stated in the lsb, it indicates that an interlaced picture or a progressive picture is to be transmitted, respectively. Moreover, if X0 to X2 and X8 to XA are stated in the lsb, it indicates that data pursuant to ITU-R BT. 709-2 is to be transmitted, whereas, if X3 and XB are stated in the lsb, it indicates that data pursuant to ITU-R BT. 601-4 is to be transmitted. If X4 and XC are stated in the lsb, it indicates that data pursuant to ITU-R BT. 1203 (PAL system) is to be transmitted.

If 10 in hexadecimal is stated in the image_format_specifier (meaning: DCF Object), it indicates that image data is to be transmitted to the printing device 5 in the format specified for the digital camera (DCF: design rule for camera format). If 10 in hexadecimal is stated in the msb of the image_format_specifier and 00 in hexadecimal is stated in its lsb, it indicates that the data of the Exif form is to be transmitted, in which the image portion is of the JPEG system and to which is appended a header recording the photographing state or conditions. If 01 in hexadecimal is stated in the lsb (type: JFIF (JPEG file interplay format), it indicates that data of the JFIF form is to be transmitted, whereas, if 02 is stated in the lsb (type: TIFF (tag image file format)), it indicates that data of the TIFF is to be transmitted. If 0F is stated (type; JPEG (joint photographic coding experts group)), it indicates that image data is to be transmitted to the printing device 5 in the JPEG form.

If 80 to 8F is stated in hexadecimal in the msb of the image_format_specifier, it indicates that transmission is to be done in other formats and data of the format specified in 00 to FF stated in the lsb is transmitted.

In the image_format_specifier, FE in hexadecimal (meaning: special meaning) may be set in the msb, whilst 00 (type: unit plug defined) and 01 (don't care) may be set in the lsb.

The data conversion unit 13 transmits the asynchronous packet 100, having stored therein the capture command, and receives an ACK (acknowledge) from the printing device 5, after which it transmits the asynchronous packet 100 containing the still image data to the printing device 5.

The still image data transmission rule is as shown in FIGS. 10 to 13.

FIG. 10 shows the image data transmission sequence when transmitting still image data of the YCC 4:2:2 pixel format point-sequentially (chunky) to the printing device 5. FIG. 11 shows the pixel data transmission sequence when transmitting the still image data of the YCC 4:2:0 pixel format point-sequentially (chunky) to the printing device 5. FIG. 12 shows the image data transmission sequence when transmitting still image data of the YCC 4:2:2 pixel format line-sequentially (liner) to the printing device 5. FIG. 13 shows the pixel data transmission sequence when transmitting the still image data of the YCC 4:2:0 pixel format line-sequentially (liner) to the printing device 5.

In FIGS. 10 to 13, $Y_i(L_j)$ denotes the luminance information Y of the pixel number i contained in the line number j, where i, used when specifying a pixel in the luminance information Y, is an integer from 1 to N, and j is an integer from 1 to M. $Cb_i(L_j)$ denotes the chroma information Cb of the pixel number i contained in the line number j, where i, used for designating a pixel of the chroma information Cb, is of a value of 1, 3, 5, . . . , N–1, whereas j is of an integer value from 1 to M for YCC 4:2:2 and is of a value of 1, 3, 5, . . . , N–1 for YCC 4:2:0. $Cr_i(L_j)$ denotes the chroma information Cr of the pixel number i contained in the line number j, where i, used for designating a pixel of the chroma information Cr, is of a value of 1, 3, 5, . . . , N–1, whereas j is of an integer value from 1 to M for YCC4:2:2 and is of a value of 1, 3, 5, . . . , N–1 for YCC 4:2:0. N and M denote the total number of pixels in a line and the total number of the pixels in an image, respectively.

When point-sequentially (chunky) transmitting still image data to the printing device 5, in which the still image having the image type of FIG. 8 of 480_422_4×3 is contained in the asynchronous packet 100, with the pixels bearing pixel numbers from 1 to 720 and from 1 to 480 in the x-direction and in the y-direction, respectively, the data conversion unit 13 transmits the pixel data as shown in FIG. 14.

That is, the data conversion unit 13 transmits, next to the address offset (address_offset), the luminance information Y1(L1), luminance information Y2(L1), chroma information Cb1 (L1) and the chroma information Cr1(L1), for the pixel number 1 contained in the line number 1. The data conversion unit 13 transmits, next to the pixel data up to the pixel numbers 720, contained in the line number 1, the luminance information and the chroma information as from the net line number 2 until it transmits the pixel data up to the pixel number 720 contained in the line number 480 to complete transmission of the still image data representing a sole still image.

If the image type is 480_420_4×3, the data conversion unit 13 transmits, next to the address offset (address_offset), the luminance information Y1(L1), luminance information Y2(L1), luminance information Y1 (L2) and the luminance information Y2(L2), for the pixel number 1 contained in the line number 1, as shown in FIG. 15. The data conversion unit 13 then transmits the chroma information Cb 1 (L1), chroma information Cr1(L1), luminance information Y3(L1) and luminance information Y4 (L1). The data conversion unit 13 then transmits the pixel data up to the pixel number 720 contained in the line number 480 to complete the transmission of pixel data representing a sole still image.

When line-sequentially (liner) transmitting still image data of the image type of 480_422_4×3, contained in the asynchronous packet 100, the data conversion unit 13 transmits, next to the address offset (address_offset), the luminance information Y1(L1), luminance information Y2(L1), luminance information Y3(L1), luminance information Y4(L1), . . . up to the luminance information Y720(L1), for the line number 1, after which it transmits the chroma information Cb1(L1), Cr1(L1), . . . , chroma information Cb720(L1), Cr720(L1), for the line number 1, and then transmits the luminance information and the chroma information for the line number 2, and so on, until it transmits the chroma information Cr720 (L480) for the line number 480 to complete the transmission of the still image data, as shown in FIG. 16.

When line-sequentially (line) transmitting still image data of the image type of 480_420_4×3, contained in the asynchronous packet 100, the data conversion unit 13 first transmits the luminance information Y1(L1) up to luminance information Y720 (L1) of the line number 1, followed by the luminance information Y1(L2) up to luminance information Y720 (L2) of the line number 2, followed by the chroma information Cb1 (L1) and the chroma information Cr1 (L1) up to the chroma information Cb720 (L1) and the chroma information Cr719 (L1) to transmit the pixel data of the line numbers 1 and 2, after which the data conversion unit 13 transmits the luminance and chroma information for the line number 3 and so on until it transmits the chroma information Cb719 (L479) and the chroma information Cr719 (L479) to complete the transmission of the still image data, as shown in FIG. 17.

If, when the still image data is transmitted to the printing device 5 for printing, as described above, the printing state of the printing device 5 is to be obtained from the data input unit 31, the data conversion unit 13 transmits a printer status 2 command, shown in FIG. 18, different from the printer status command already proposed in the IEEE 1394 standard, referred to below as the printer status 1 command, as a command packet to the printing device 5.

The data conversion unit 13 receives a response packet, having stored therein a response to transmission to the printing device 5 of the command packet having stored therein the printer status 1 command or the printer status 2 command. The data conversion unit 13 checks into the data stored in the response packet to recognize by the CPU 23 an error or an alarm taking place in the printing device 5.

The printer status 1 command is a command demanding information specifying whether or not there is a printing sheet (Empty), the information indicating whether the printer device is on-line or off-line (Line), the information indicating whether or not the printer device is operable (Fatal), and the information indicating whether or not the operating state of the printer device is recoverable (Recoverable) from the printing device 5. Each such information is composed of a one-bit data. On reception of a response packet, in which the bit for each information has been set in the data input unit 31, the data input unit 31 recognizes that an error has occurred in the printing device 5.

In the printer status 2 command, the information indicating the printer status 2 command (PRINTER STATUS 2 command) is stored as an opcode (operating code) in "53" hexadecimal. Then, "reserved" is stored in an operand [0], "status" indicating various errors is stored in the operand [1] and in the operand [2], and "reserved" is stored in the operand [3] and in the operand [4]. Then, "Current_print-_job_ID", specifying the job currently printed is stored in the operands [5] to [16], "warning" indicating the alarm is stored in the operand [17] and "reserved" is stored in the operands [18] to [20].

In the status, the error information is stored, as shown in FIGS. 19 and 20. That is, there are stored in the status the colorant error information, indicating whether or not the colorants, such as dye, ink, ribbon or toner is depleted, cover error information (Cover_open), indicating whether or not a cover constituting a casing of the printing device 5 is open, sheet stuffing error information (jammed), indicating whether or not paper sheet jamming has occurred, the head error information (Head_error), indicating whether or not the printer head is not operable, printing size error information (Small_paper), indicating whether or not the printing paper sheet is small-sized, the cartridge error information (No_cartridge), indicating whether or not there is no cartridge, use error information (occupied) indicating whether or not the printing device 5 is used by another equipment connected to the printing device 5, testing error information (testing) indicating whether or not the printing device 5 is being tested, and the readying error information (Warmup) indicating whether or not the printing device 5 is being readied.

The above-mentioned various information is 1-bit data represented by 0 or 1. If 0 is stored in the colorant error information, it indicates that the colorant is usable, whereas, if 1 is stored therein, it indicates that the colorant is depleted.

If 0 is stored in the cover error information, it indicates that the cover is not open, whereas, if 1 is stored in the cover error information, it indicates that the cover is open.

If 0 is stored in the paper stuffed error information, it indicates that no paper jamming is produced, whereas, if 1 is stored therein, it indicates that paper jamming is produced.

If 0 is stored in the head error information, it indicates that the printer head can be operated, whereas, if 1 is stored therein, it indicates that the printer head cannot be operated.

If 0 is stored in the printing size error information, it indicates that the printing paper sheet is not small-sized, whereas, if 1 is stored therein, it indicates that the printing paper sheet is small-sized.

If 0 is stored in the cartridge error information, it indicates that the cartridge is usable, whereas, if 1 is stored therein, it indicates that there is no cartridge available.

If 0 is stored in the use error information, it indicates that the printing device is not being used by another equipment, whereas, if 1 is stored therein, it indicates that the printing device is being used by another equipment.

If 0 is stored in the testing error information, it indicates that the printing device is not being tested, whereas, if 1 is stored therein, it indicates that the printing device is being tested.

If 0 is stored in the readying error information, it indicates that the printing device is not being warmed up for printing, whereas, if 1 is stored therein, it indicates that the printing device is being warmed up for printing.

Figure 21:
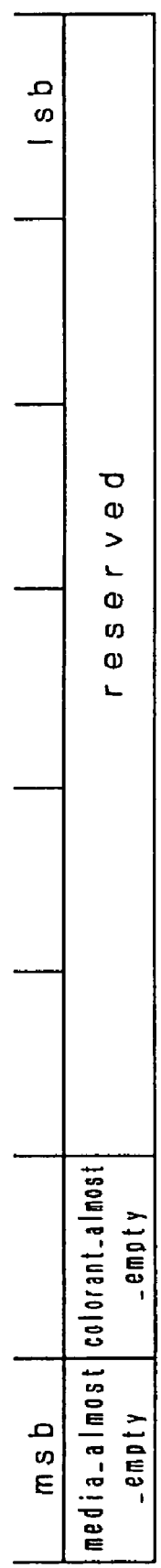
FIG. 21 illustrates the contents of a warning contained in the printer status 2 command.

In the warning, there is stored the alarm information for giving a warning to the printing processing, as shown in FIGS. 21 and 22. That is, there are stored in the warning the printing paper sheet alarm information (media_alarm-_empty), indicating a warning as to the remaining paper sheets provided in the printing device 5, and the colorant alarm information (colorant almost empty) indicating an alarm as to the remaining quantity of the colorant in the printing device 5.

The above-mentioned information, stored in the warning, is the 1-bit information, represented by 0 or 1. If 0 is stored in the printing paper sheet alarm information, it indicates that there is sufficient amount of the printing paper sheets, whereas, if 1 is stored therein, it indicates that only a small amount of the printing paper sheets.

If 0 is stored in the colorant alarm information, it indicates that a sufficient amount of the colorant is usable, whereas, if 1 is stored therein, it indicates that the colorant is substantially depleted.

The printing device 5 includes a data input unit 31, fed with still image data from the printing device 5, a ROM (read-only memory) 32, in which a printing control program is stored, a printing engine 33 for printing on a medium, a RAM 34 and a CPU 35 controlling various portions of the printing device 5, as shown in FIG. 2.

The data input unit 31 is made up of an interfacing circuit, pursuant to, for example, the IEEE 1394 standard, and is responsive to a control signal from the CPU 35 to process the still image data contained in the asynchronous packet 100 from the STB 3 in accordance with the IEEE 1394 standard.

Specifically, this data input unit 31 performs processing for the transaction layer, link layer and the physical layer, under serial management pursuant to the IEEE 1394 standard. So, the data input unit 31 outputs the still image data contained in the asynchronous packet 100 to the CPU 35.

If mechanically connected over e.g., an optical cable to the STB 3, the data input unit 31 effects connection setting with the data conversion unit 13 of the STB 3 for transmitting/receiving the asynchronous packet 100 with the printing device 5.

The data input unit 31 is also fed from the CPU 35 with a control signal stating that a colorant error, cover error, a jamming error, a head error, a printing size error, a cartridge error, a use error, a testing error and a readying error have been produced.

In addition, the data input unit 31 is fed with a control signal indicating that the remaining amount of the printing paper sheets or the colorant has been verified to be small and less than a pre-set value.

If the data input unit 31 has received a command packet containing the printer status 1 command, it is fed from the CPU 35 with a control signal indicating whether or not an error is produced, and generates a response packet, in which a bit for each information (Empty, Line, Fatal and Recoverable) is set, as a response to the command, to output the so-produced response packet to the data input unit 31.

If the data input unit 31 has received a command packet containing the printer status 2 command, it is fed from the CPU 35 with a control signal indicating whether or not an error and an alarm are produced, and generates a response packet, in which bits for the error information and the alarm information are set, as a response to the command, to output the so-produced response packet to the data input unit 31.

The printing engine 33 is made up of a medium holding and driving mechanism, a printer head, and a printer head driving mechanism, and is driven by the CPU 35 to print a still image on the medium.

The CPU 35 generates a control signal controlling the data input unit 31 and the printing engine 33. At this time, the CPU 35 operates under a printing control program stored in the ROM 32, while controlling the contents of the RAM 34, which then is operating as a work area.

If the colorant error, cover error, jamming error, head error, printing size error, cartridge error, use error, testing error or the readying error has been produced, the CPU 35 issues a control signal stating that effect to the data input unit 31.

If the CPU 35 has verified that the remaining amount of the printing paper sheets or the colorant has been verified to be small and less than a pre-set value, it issues a control signal stating that effect to the data input unit 31.

If fed from the data input unit 31 with the information indicating various printing settings, such as the printing sheet type information (media_type), printing sheet size information (Media_size), printing quality information (Print_quality), printing color information (Mono_color), printing offset position information (offset) and the printing layout information (Layout_type), the CPU 35 controls the printing engine 33 responsive to the variable printing settings.

Figure 23:
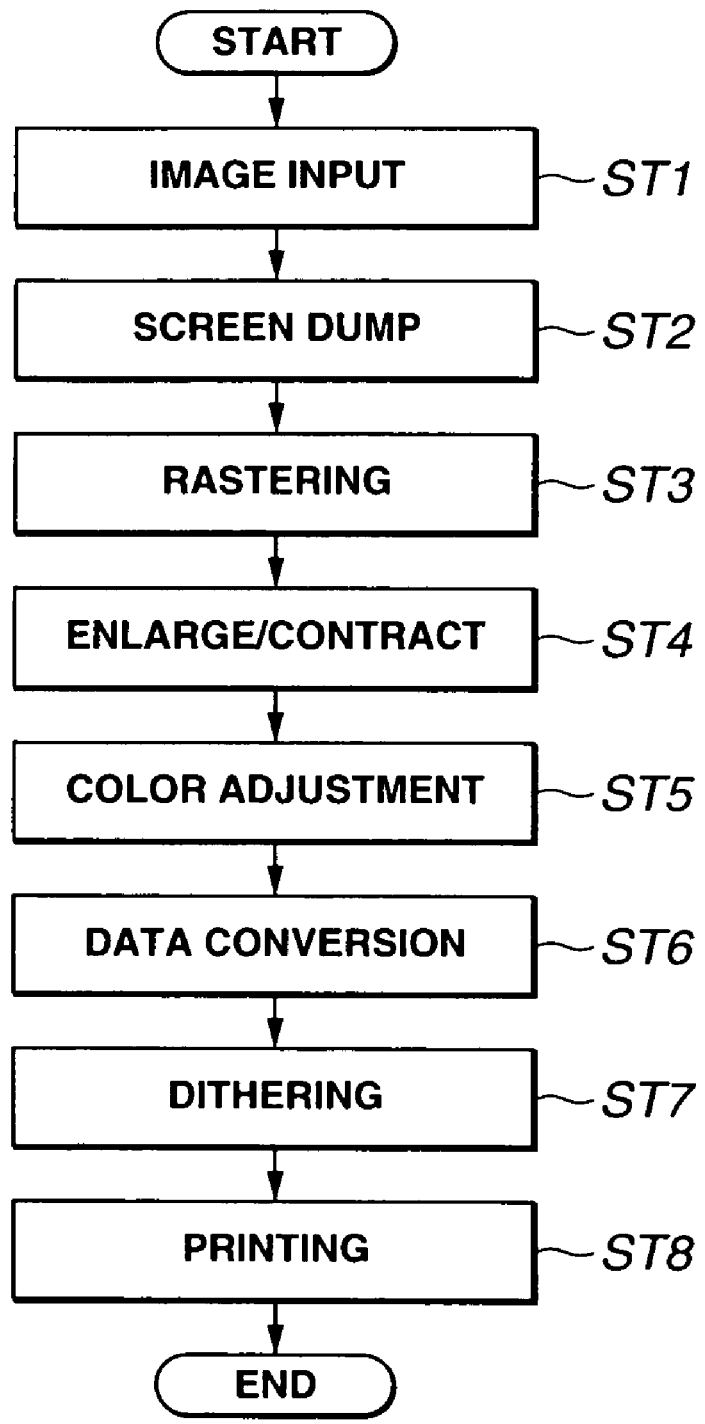
FIG. 23 illustrates the processing sequence by the CPU of the STB in printing an image displayed on a television receiver device by a printing device.
Figure 24:
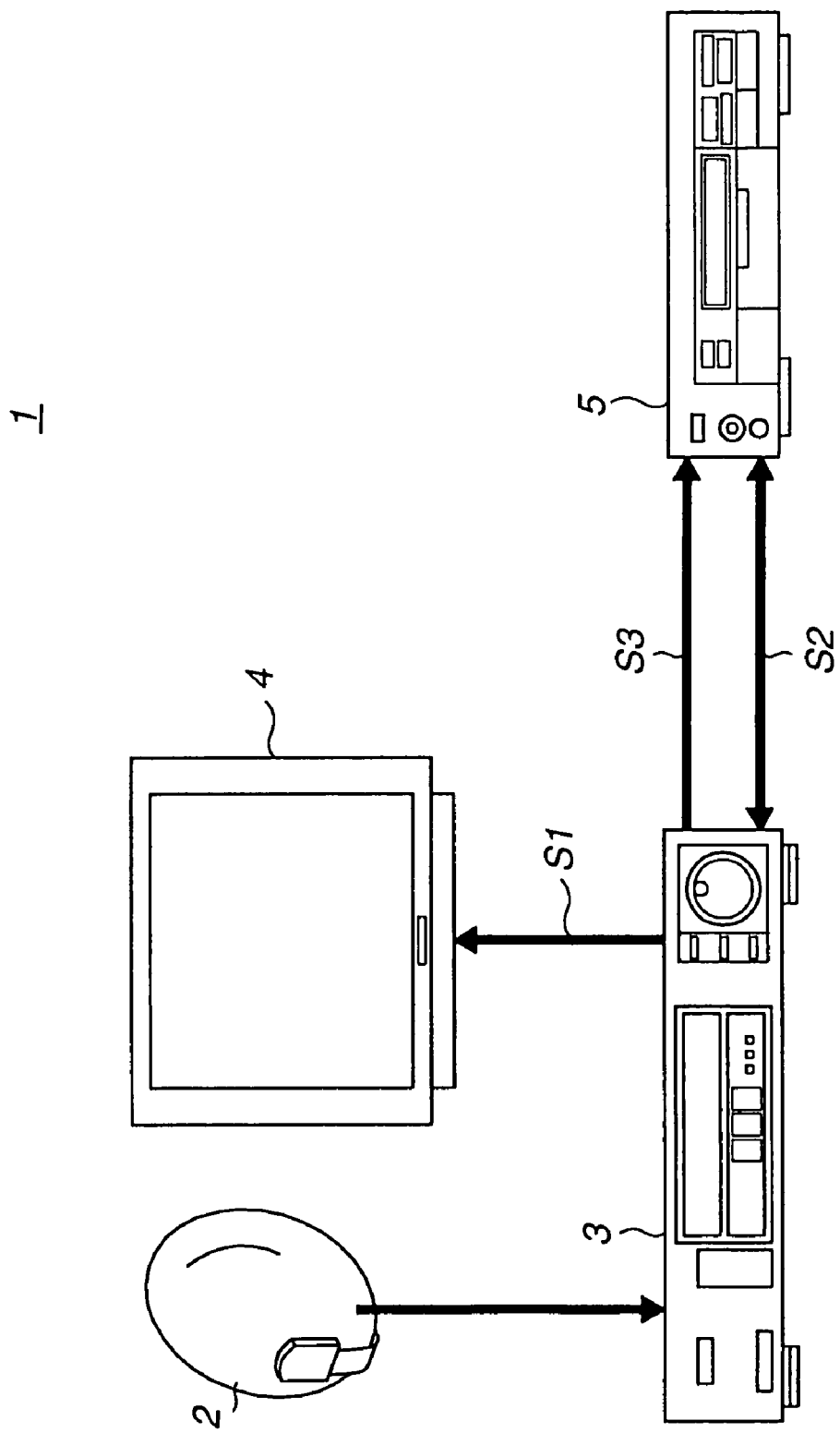
FIG. 24 illustrates the processing sequence by the CPU of the STB in printing an image displayed on a television receiver device by a printing device.

In accordance with the printing control program, the CPU 35 performs the processing shown in the flowchart of FIG. 23.

First, at step ST1 in FIG. 23, the data input unit 31 of the printing device 5 receives a data packet generated pursuant to the IEEE 1394 standard from the data conversion unit 13. At this time, the data input unit 31 performs processing in the transaction layer, link layer and in the physical layer pursuant to the IEEE 1394 standard to extract still image data corresponding to the YCC image made up of the luminance information Y and the chroma information Cr, Cb.

At the next step ST2, the CPU 35 performs screen dumping for printing the entire data displayed on the screen of the television device 4.

At the next step ST3, the CPU 35 performs rastering on the still image data screen-dumped at the above step ST2. That is, the CPU 35 converts the still image data into dot-type data for transferring the still image data to the printing engine 33.

At the next step ST4, the CPU 35 enlarges/contracts the still image data, rastered at the above step ST3, in accordance with e.g., the printing size information. That is, the CPU 35 manages control to vary the size of the still image being printed e.g., within a range specified by the user.

At the next step ST5, the CPU 35 adjusts the color of the still image data, enlarged/contracted at the above step ST4, to change the still image data composed of the luminance information and the chroma information into printing data composed of red (R), green (G) and blue (B) data.

The relation between the pixel values, specified in the color space by the Y (ITU-R BT. 601-4) format, and the pixel value, specified in the color space by RGB, is as follows:

$$Y'_{601YCC} = 0.299*R'_{RGB} + 0.587*G'_{RGB} + 0.144*B'_{RGB}$$

$$Cr'_{601YCC} = 0.713*(R'_{RGB} - Y'_{601YCC}) = 0.500*R'_{RGB} - 0.419*G'_{RGB} - 0.081*B'_{RGB}$$

$$Cb'_{601YCC} = 0.564*(R'_{RRB} - Y'_{601YCC}) = -0.169*R'_{RGB} - 0.331*G'_{RGB} + 0.500*B'_{RGB}$$

In terms of an 8-bit value, the following relation holds:

$$Y'_{601YCC\_8bit} = (219.0*Y'_{601RGB}) + 16.0$$

$$Cr'_{601YCC\_8bit} = (224.0*Cb'_{601YCC}) + 128.0$$

$$Cb'_{601YCC\_8bit} = (224.0*Cr'_{601YCC}) + 128.0.$$

This 8-bit value is returned as image data from the STB 3 to the printing device 5. At this step ST5, the 8-bit YCC value is converted into RGB.

The relation between the pixel values, specified in the color space by the Y (ITU-R BT. 709-2) format, and the pixel value, specified in the color space by RGB, is as follows:

$$Y'_{709YCC} = 0.2126*R'_{RGB} + 0.7152*G'_{RGB} + 0.0722*B'_{RGB}$$

$$Cr'_{709YCC} = 0.5389*(B'_{RGB} - Y'_{709YCC})$$

$$Cb'_{709YCC} = 0.6350*(R'_{RGB} - Y'_{709YCC}).$$

In terms of an 8-bit value, the following relation holds:

$$Y'_{709YCC\_8bit} = (219.0*Y'_{709RGB}) + 16.0$$

$$Cr'_{709YCC\_8bit} = (224.0*Cb'_{709YCC}) + 128.0$$

$$Cb'_{709YCC\_8bit} = (224.0*Cr'_{709YCC}) + 128.0.$$

This 8-bit value is returned as image data from the STB 3 to the printing device 5. At this step ST5, the 8-bit YCC value is converted into RGB.

At the next step ST6, the CPU 35 effects color adjustment and performs processing of converting RGB printing data to cyan, magenta and yellow, to determine the ratio of the cyan, magenta and yellow in each dot. At the next step ST7, the CPU 35 dithers the printing data.

At step ST8, the CPU 35 outputs the printing data, obtained on dithering, to the printing engine 33 to drive the printing engine 33 to print an image on a medium.

In the above-described image printing system 1, the processing performed by the CPU 23 in printing the image data received by the STB 3 by the printing device 5 is explained with reference to FIG. 25.

Figure 25:
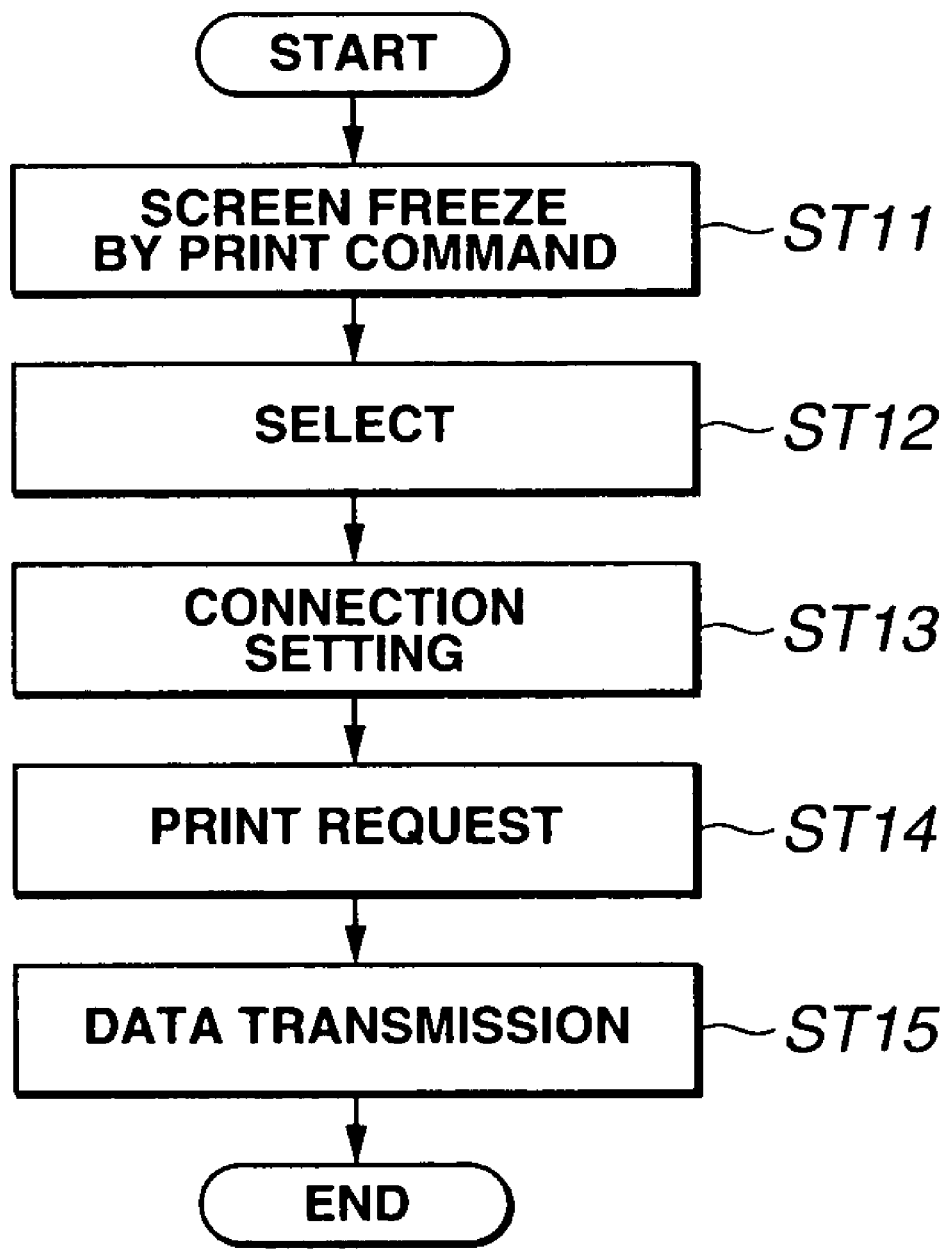
FIG. 25 is a flowchart for illustrating a processing sequence by the CPU of the STB in printing an image displayed on a television receiver device by a printing device.

In the flowchart shown in FIG. 25, the CPU 23 is fed at step ST11 with an operating input signal to the effect that the moving picture displayed on the television device 4 be frozen, by the user acting on an operating button provided on the STB 3. The CPU 23 is responsive thereto to control the display controller 19 to halt the outputting of the moving picture data from the NTSC processor 18 to the television device 4 to display a still image on the television device 4.

If, at the next step ST12, the operating input signal for selecting the frame-based still image data, demonstrated on the television device 4 and frozen by the operation at step ST11, and for printing the displayed image data on the printing device 5, is sent to the CPU 35, the CPU controls the display controller 19, MPEG processor 16 and the demultiplexer 14 to read the frame-based still image data stored in the display memory 20 into the image memory 15. This causes the CPU 23 to store the still image data, composed of the luminance information Y and the chroma information Cr, Cb, in the image memory 15.

At the next step ST13, the CPU 35 controls the data conversion unit 13 so that connection setting will be made between the STB 3 and the printing device 5 in accordance with the IEEE 1394 standard. That is, if fed with the control signal for connection setting from the CPU 23, the data conversion unit 13 generates a command packet to recognize the plug with the data input unit 31. At this time, the data conversion unit 13 send the command packet, in which the information indicating the transmitting side plug is stored by the data input unit 31 of the printing device 5. The data input unit 31 of the printing device 5 recognizes the information, representing the reception side plug, and transmits to the data conversion unit 13 a command packet S2 which has stored the information indicating the reception side plug. Thus, the data conversion unit 13 recognizes the information indicating the reception side plug of the data input unit 31 of the printing device 5. The data input unit 31 recognizes the information representing the transmitting side plug of the data conversion unit 13 of the STB 3.

At the next step ST14, the CPU 23 demands the information on the printing size, printing direction and the number of prints, in printing the still image, from the printing device 5.

At the next step ST15, the CPU 23 controls the demultiplexer 14 and the data conversion unit 13 to output still image data to be printed by the printing device 5, to the printing device 5, to generate a data packet S2 containing still image data stored in the image memory 15 to transmit the generated packet to the printing device 5.

If the printing device 5 receives plural data packets, containing the destination plug denoting information, to verify that the still image data in their entirety has been received, the printing device 5 causes the CPU 35 to perform the processing shown in FIG. 23, to effect the printing of the image represented by the still image data in accordance with the designated printing size.

An example of the operation of transmitting/receiving the asynchronous packet 100 between the STB 3 and the printing device 5 to print the still image data by the printing device 5 is now explained with reference to FIG. 26.

Figure 26:
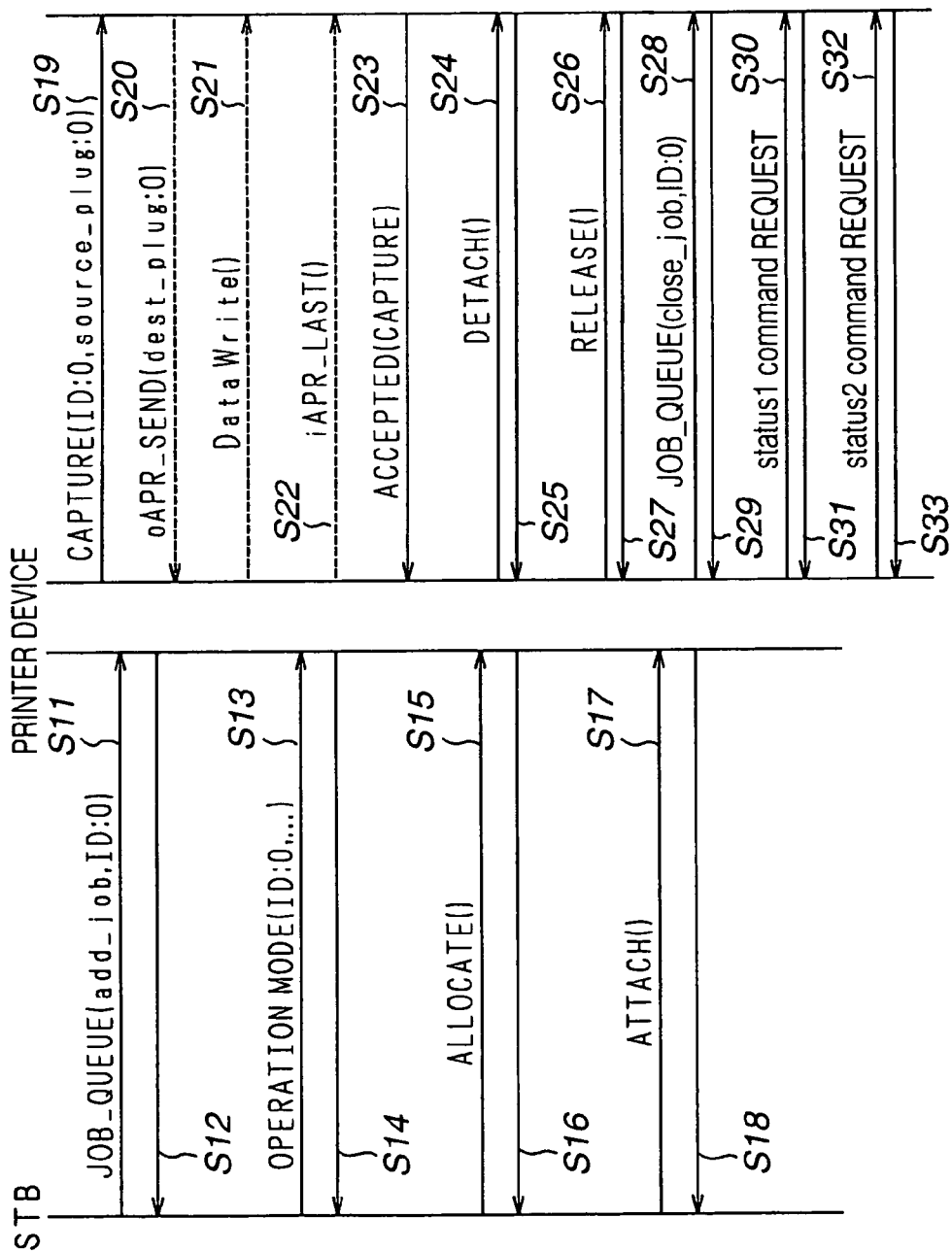
FIG. 26 illustrates the processing for printing still image data by a printing device by transmitting/receiving an asynchronous packet between the STB and the printing device.

In FIG. 26, the data conversion unit 13 prior to starting the printing transmits to the printing device 5 a command packet (JOB_QUEUE) S11 to indicate that there is a job of printing a still image, and acquires a corresponding response packet S12.

On the other hand, the data conversion unit 13 transmits to the printing device 5 a command packet S13 specifying the operation mode indicating the type or size of the printing sheet for printing by the printing device 5, printing quality, color for printing (monochromatic/color) or the printing position, to acquire the corresponding response packet S14.

The data conversion unit 13 sets a plug for transmitting the still image data to the data input unit 31. That is, the data conversion unit 13 sends the command packet S15, having the ALLOCATE command stored therein, to the data input unit 31, instructing the data input unit 31 to set a reception plug, to acquire a corresponding response packet S16.

The data conversion unit 13 also sends a command packet S17, having stored therein an ATTACH command, for setting a plug for receiving a data packet containing the still image data to be printed by the printing device 5 to transmit/receive the dat packet, and acquires a corresponding response packet S18.

The data conversion unit 13 then transmits a command packet S19 containing a capture command. In the command packet S19 is stored the information (source_plug) indicating the transmission side plug on the side data conversion unit 13, whereby the data input unit 31 recognizes the transmission side plug of the data conversion unit 13.

The data input unit 31 then transmits to the data conversion unit 13 a packet S20 including the information for setting an OAPR (output asynchronous port register). In the packet S20 is stored the information representing the destination plug of the data input unit 31 (dest_plug). At this time, the data input unit 31 on reception of the command packet S19 transmits the information specifying the recognized transmission side plug by a packet S20. The data conversion unit 13 recognizes the destination plug of the data input unit 31.

The data conversion unit 13 transmits to the data input unit 31 a data packet S21 having stored in the data portion 102 the YCC image as the still image data. The data conversion unit 13 splits the still image data into pre-set data volumes to transmit the resulting plural data packets S21.

The data conversion unit 13 transmits to the data input unit 31 a response packet S22 containing the information pertinent to the iAPR (input Asynchronous Port Register) of the flow control register of the transmission side plug.

The data conversion unit 13 transmits to the data conversion unit 13 a command packet S23 indicating acceptance of the capture command.

The data conversion unit 13 is responsive thereto to transmit a command packet S24 containing a DETACH command indicating the disconnection from the printing device 5 to acquire a response packet S25 from the data input unit 31.

The data conversion unit 13 then transmits a command packet S26, containing a RELEASE command, to the data input unit 31 of the printing device 5, to acquire a corresponding response packet S26 from the data input unit 31.

The data conversion unit 13 then sends to the data input unit 31 a command packet (JOB_QUEUE) S28, indicating completion of the sequence indicating the job for printing a still image, and acquires a corresponding response packet S29.

When acquiring the status in performing the printing in the printing device 5, the data conversion unit 13 sends a command packet S30, requesting transmission of a command packet containing the printer status 1 command, to the data input unit 31, and acquires a corresponding response packet S31.

Then, in acquiring the status in effecting the printing in the printing device 5, the data conversion unit 13 sends a command packet S32, requesting transmission of a command packet containing the printer status 2 command, to the data input unit 31, to acquire a response packet S33 thereto.

Figure 27:
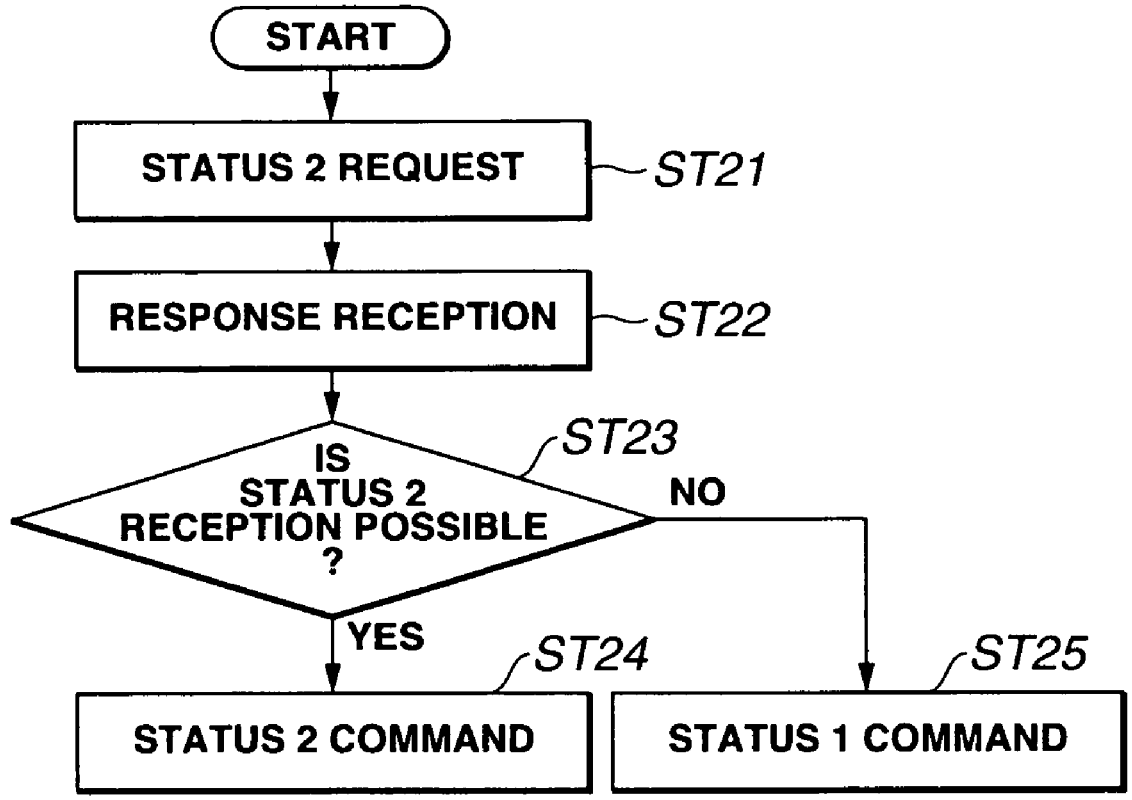
FIG. 27 is a flowchart for illustrating the processing of a data conversion unit when selecting a printer status 1 command or a printer status 2 command.

The data conversion unit 13 at step ST21 transmits a command packet S32, requesting transmission of a command packet, containing the printer status 2 command, to the data input unit 31, as shown in FIG. 27.

At the next step ST22, the data conversion unit 13 receives a response packet S33 to the command packet S32, transmitted at step ST21.

At the next step ST23, the data conversion unit 13 verifies, by the response packet S33, received at step ST22, whether or not the printer status 2 command is acceptable.

That is, the data conversion unit 13 verifies whether or not the data input unit 31 is adapted for coping with the printer status 2 command. If the data conversion unit 13 has verified that the data input unit 31 is adapted for coping with the printer status 2 command, the data conversion unit 13 transfers to step S24 to perform the processing of transmitting the command packet containing the printer status 2 command when the printing device 5 is performing the printing.

If the data conversion unit 13 has verified that the data input unit 31 is not adapted for coping with the printer status 2 command, the data conversion unit 13 transfers to step ST25, where the data conversion unit 13 performs the processing of transmitting a command packet containing the printer status 1 command if the data input unit 31 is adapted for coping with the printer status 1 command.

Figure 28:
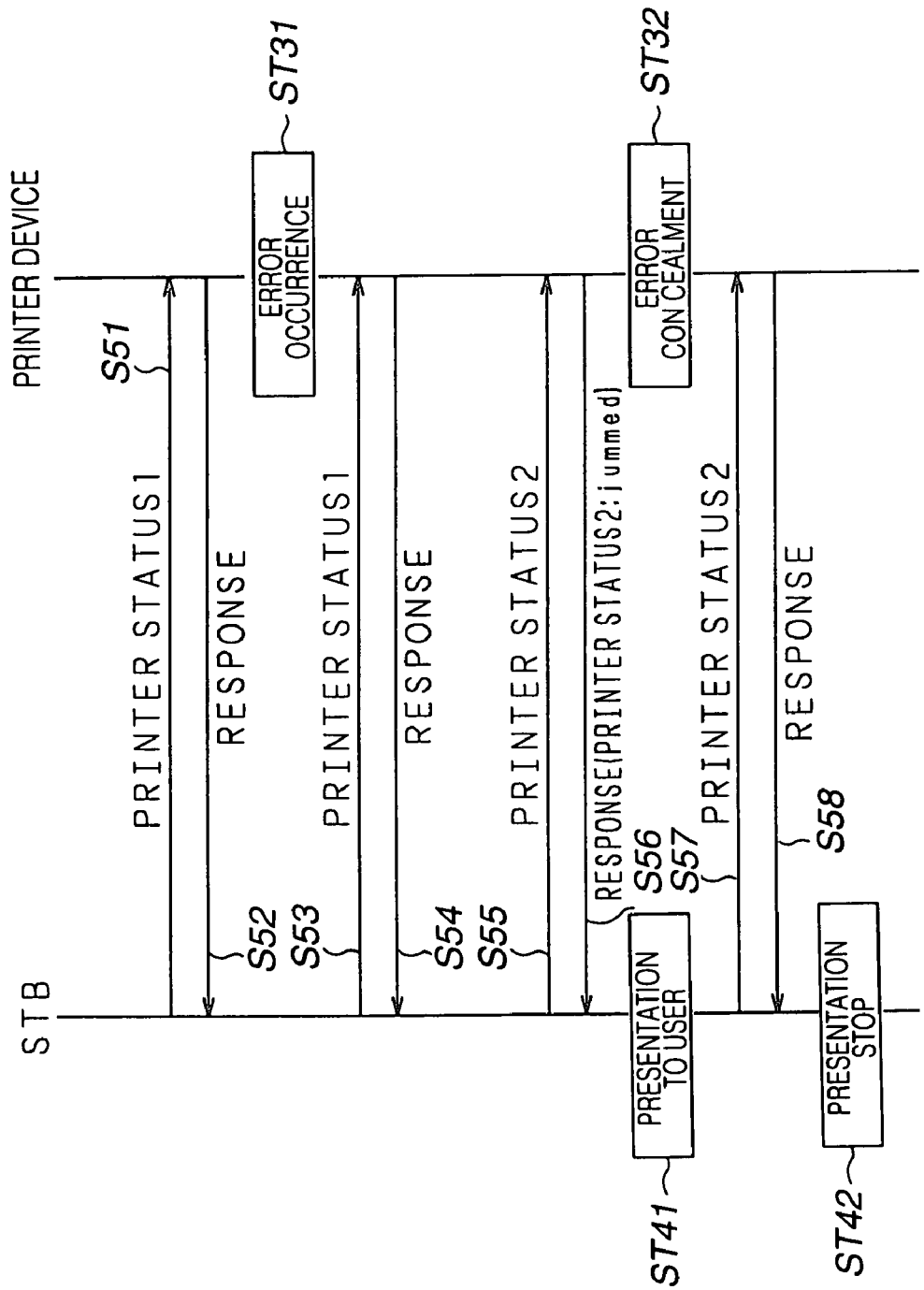
FIG. 28 illustrates the processing of the STB and the printer employing the printer status 1 command or the printer status 2 command on error occurrence in the printer device during printing by the printer device.

Referring to FIG. 28, the processing of the STB 3 and the printing device 5, employing the printer status 1 command and the printer status 2 command, in case an error has occurred in the printing device 5 while the processing for printing is going on in the printing device 5, is explained.

If the printing processing is started in the printing device 5, and no error nor alarm has been produced in the processing for printing, the data conversion unit 13 of the STB 3 is responsive to the transmission of a command packet S51 containing the printer status 1 command to the data input unit 31 of the printing device 5 to acquire a response packet S51 indicating that no error nor alarm has been produced.

If an error is produced during the printing processing by the printing device 5 due to, for example, paper jamming, the CPU 35 outputs a control signal from the CPU 35 stating that paper jamming has occurred. If the data input unit 31 is first fed with the control signal from the CPU 35 and subsequently has received a command packet S53 containing the printer status 1 command, the data input unit 31 performs the processing of setting a bit for the information (Recoverable) contained in a response packet S54 to return the bit. By this, the printing device 5 advises the effect of error occurrence to the STB 3 during printing processing.

On reception of the response packet S54, the data conversion unit 13 transmits a command packet S55, containing the printer status 2 command requesting more detailed error contents to the data input unit 31.

The data input unit 31 is responsive thereto to transmit a response packet S56, containing the printer status 2 command, having set the bit indicating the paper jamming error information (jammed) to the data conversion unit 13.

On transmitting the response packet S56, the data conversion unit 13 at step ST41 outputs the effect that the paper jamming error information has been produced during the printing processing to the CPU 23, which then controls the television device 4 to display the effect of the occurrence of the paper sheet jamming during the printing processing. By this, the STB 3 presents to the user the fact that the paper jamming has occurred during the printing processing. At step ST32, the user repairs paper jamming in the printing device 5 to repair the error that has occurred in the printing device 5.

The data conversion unit 13 transmits to the data input unit 31 a command packet S57 containing the printer status 2 command. The data input unit 31 is responsive to the repair of the paper jammed state to transmit to the data conversion unit 13 a response packet S58 having the paper sheet jamming error information set to 0.

Responsive to reception of the response packet S58, the data conversion unit 13 outputs to the CPU 23 the effect that the error produced by the paper sheet jamming in the printing device 5 has now been repaired. The CPU 23 manages control to stop the display of the effect of error occurrence by paper jamming to present to the user that printing processing is possible in the printing device 5.

In the above-described example, shown in FIG. 22, paper jamming has occurred during printing processing. However, such an error may occur in which printing has been disabled by the opened cover of the printing device 5. Such error is likely to be produced during, before and after the process shown in FIG. 20. In order to cope with such error, the image printing system 1 transmits to the printing device 5 a command packet requesting the data conversion unit 13 to transmit a command packet containing the printer status 1 command or the printer status 2 command.

30.

For example, the data conversion unit 13 periodically issues a request for transmission of a command packet containing the printer status command. This request issuing interval may be varied depending on the prevailing conditions or the system configuration, so that, if priority is to be placed on the announcement of the status of the printing device 5, the request is issued e.g., every second, whereas, if priority is to be placed on reducing the cost of communication, the request is issued every ten seconds. If the command packet is in a competing state with respect to other FCP commands, that is if the response from the other FCP command is being awaited, the occurrence of the request for transmission of a response of the other FCP command is cancelled, or alternatively, the request for transmitting a command packet containing the printer status command is stored e.g., in a memory and produced on occurrence of a response of the other FCP command. If the request for transmission of the command packet is to be produced after response of the other FCP command, the next occurring transmission request for a printer status command may be produced after lapse of a pre-set period, such as one second or 10 seconds, as from the time of occurrence, or stand-by time may be discounted and the transmission request may be produced in synchronism with the original occurrence period.

It is also possible for a request for transmission of the command packet containing the printer status command to be produced before transmission of the command pertinent to a pre-set printing job or before transmission of the image data transmission command.

Specifically, the request for transmission of the command packet containing the printer status command is produced before generation of the command indicating the start of the printing job (JOB QUEUE (add_job, ID:X)), the command indicating the end of the printing job (JOB_QUEUE(close-_job, ID:X)) or the command stating the effect of transmission of the image data (CAPTURE).

In the image printing system 1, described above, a command packet containing a printer status 2 command is transmitted to the data input unit 31, even if the STB 3 and the printing device 5 are interconnected in accordance with the IEEE 1394 standard, and the error or alarm produced in the printing device 5 may be acquired in the data conversion unit 13 responsive to the response packet from the data input unit 31. Thus, by displaying the detailed contents of the error and the alarm in the television device 4, the user may be prompted to take proper measures against the error or the alarm in effecting the printing processing by the printing device 5.

Also, in the image printing system 1, in which, even if the STB 3 and the printing device 5 are interconnected in accordance with the IEEE 1394 standard, it is possible to transmit the command packet containing the printer status 2 command to the data input unit 31 to acquire the detailed alarm information from the data conversion unit 13, the user can be prompted to take proper measures against the alarm to prevent an error from being produced in the printing device 5.

In the foregoing explanation of the image printing system 1, the STB 3 and the printing device 5 are provided with the data conversion unit 13 and the data input unit 31, as interfacing circuits in meeting with the IEEE 1394 standard. However, any other suitable interfacing circuits, such as USBs, may also be employed. Specifically, with the image printing system 1 provided with the STB 3 having the USB and the printing device 5, it is possible to transmit/receive packets between the STB 3 and the printing device 5 by the digital system to print a fine image by the printing device 5.

What is claimed is:

1. An image processing apparatus comprising:
   image processing means for generating desired still image data corresponding to inputted image data;
   printing state information request generating means for generating the printing state information request requesting the printing state information indicating a printing state of a printing device;
   outputting means for outputting the still image data generated in said image processing means included in a packet and for defining the printing state information request generated by said printing state information request generating means by an AV/C command set consistent with a FCP (Function Control Protocol) and for outputting the resulting request to the printing device; and
   printing state presentation means for presenting to a user the printing state in accordance with the printing state information on the image processing apparatus,
   wherein said outputting means repeatedly outputs said printing state information request to said printing device at a variable interval.

2. The image processing apparatus according to claim 1 wherein
   said outputting means outputs said printing state information request before transmitting a command indicating the start of a printing job, a command indicating the end of a printing job, or a capture command indicating the effect that image data is being transmitted.

3. An image processing method comprising:
   generating desired still image data corresponding to inputted image data;
   generating a printing state information request which requests printing state information indicating a printing state of a printing device;
   having the generated still image data contained in a packet to output the resulting packet to said printing device;
   simultaneously defining the generated printing state information request in an AV/C command set consistent with an FCP (Function Control Protocol) to output the resulting defined printing state to said printing device;
   receiving said printing state information transmitted from said printing device in accordance with said FCP; and
   presenting the printing state to a user in accordance with the printing state information on an image processing apparatus,
   repeatedly transmitting said printing state information request to said printing device at a variable interval.

4. The image processing method according to claim 3 wherein said printing state information request is outputted before transmitting a command indicating the start of a printing job, a command indicating the end of a printing job, or a capture command indicating the effect that image data is being transmitted.

5. A printing device comprising:
   inputting means fed with still image data contained in a packet and with a printing state information request defined by an AV/C command set consistent with an FCP (Function Control Protocol);
   printing means for printing still image data inputted to said inputting means;
   printing state information generating means for generating the printing state information indicating a printing state of the printing device; and
   outputting means for outputting said printing state information in accordance with the FCP responsive to the printing state information request fed to said inputting means to be displayed to a user on an image processing apparatus,
   wherein said inputting means repeatedly receives said printing state information request at a variable interval.

6. A printing method comprising:
   inputting still image data contained in a packet and a printing state information request defined by an AV/C command set consistent with an FCP (Function Control Protocol);
   printing the input still image data; and
   generating the printing state information indicating a printing state responsive to the input printing state information request to output said printing state information in accordance with the FCP to be displayed to a user on an image processing apparatus,
   repeatedly inputting said printing state information request at a variable interval.

7. An image printing system comprising:
   an image processing apparatus comprising:
   image processing means for generating desired still image data corresponding to inputted image data;
   printing state information request generating means for generating the printing state information request requesting the printing state information indicating a printing state of a printing device;
   outputting means for having the still image data generated in said image processing means included in a packet and for defining the printing state information request generated by said printing state information request generating means by an AV/C command set consistent with a FCP (Function Control Protocol) and for outputting the resulting request to the printing device;

wherein said outputting means repeatedly outputs said printing state information request to said printing device at a variable interval; and printing state presentation means for presenting to a user the printing state in accordance with the printing state information on the image processing apparatus;

said printing device comprising:

inputting means fed with still image data outputted by said image processing apparatus and with a printing state information request;

printing means for printing the still image data fed to said inputting means;

printing state information generating means for generating the printing state information indicating the printing state of the printing device; and outputting means for outputting said printing state information in accordance with the FCP to said image processing apparatus responsive to the printing state information request fed to said inputting means, wherein said inputting means repeatedly receives said printing state information request at a variable interval.

8. The image processing apparatus according to claim 7 wherein, said outputting means of the image processing apparatus outputs said printing state information request to the printing device before transmitting a command indicating the start of a printing job, a command indicating the end of a printing job, or a capture command indicating the effect that image data is being transmitted.

9. An image printing method wherein on an image processing device, desired still image data corresponding to inputted image data are generated, a printing state information request which requests the printing state information indicating a printing state of a printing device is generated, the generated still image data is contained in a packet, and the resulting packet is outputted to said printing device; the generated printing state information request is defined in an AV/C command set consistent with an FCP (Function Control Protocol) to output the resulting defined printing state information request to said printing device;

wherein said printing state information request is repeatedly outputted to said printing device at a variable interval;

wherein on a printing device side, still image data outputted by said image processing apparatus and a printing state information request are inputted, the input still image data is printed, the generated printing state information indicating the printing state of the printing device is outputted responsive to the input printing state information request to the image processing apparatus in accordance with the FCP; and wherein on the image processing side, said printing state information transmitted from said printing device in accordance with an FCP is received and the printing state is presented to a user in accordance with the printing state information on an image processing apparatus.

10. The image printing system according to claim 9 wherein said outputting means of the image processing apparatus outputs said printing state information request to the printing device before transmitting a command indicating the start of a printing job, a command indicating the end of a printing job, or a capture command indicating the effect that image data is being transmitted.

11. A recording medium having stored therein an image processing program, said program comprising:

generating desired still image data corresponding to inputted image data;

generating printing state information request which requests the printing state information indicating a printing state of a printing device;

having the generated still image data contained in a packet to output the resulting packet to said printing device;

simultaneously defining the generated printing state information request in an AV/C command set consistent with an FCP (Function Control Protocol) to output the resulting defined printing state information request to said printing device;

receiving said printing state information transmitted from said printing device in accordance with the FCP; and presenting the printing state to a user in accordance with said printing state information on an image processing apparatus, wherein said printing state information request is repeatedly outputted to said printing device at a variable interval.

12. A recording medium having stored therein an image processing program, said program comprising:

inputting still image data contained in a packet and a printing state information request defined by an AV/C command set consistent with an FCP (Function Control Protocol);

printing still image data inputted to said inputting means;

generating the printing state information indicating the printing state responsive to the printing state information request to output said printing state information in accordance with the FCP to be displayed to a user on an image processing apparatus, repeatedly inputting said printing state information request at a variable interval.

* * * * *